(12) United States Patent
Kato

(10) Patent No.: US 6,311,174 B1
(45) Date of Patent: Oct. 30, 2001

(54) PROBLEM SOLVING APPARATUS HAVING LEARNING FUNCTION

(75) Inventor: Hideki Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/828,886

(22) Filed: Mar. 31, 1997

(30) Foreign Application Priority Data

Jun. 28, 1996 (JP) .................................................. 8-169838

(51) Int. Cl.$^7$ ...................................................... G06F 15/18
(52) U.S. Cl. ................................ 706/25; 706/16; 706/10; 706/44
(58) Field of Search .................. 395/23; 706/15–17, 706/25, 10, 44

(56) References Cited

U.S. PATENT DOCUMENTS

| | | | |
|---|---|---|---|
| 5,095,443 | * 3/1992 | Watanabe | 706/10 |
| 5,485,545 | * 1/1996 | Kojima et al. | 706/23 |
| 5,909,681 | * 6/1999 | Passera et al. | 707/8 |
| 5,995,651 | * 11/1999 | Gelenbe et al. | 382/156 |

OTHER PUBLICATIONS

D.E. Moriarty and R. Miikkulainen, "Evolving Neural Networks to Focus Minimax Search," Proceedings of the 12th National Conference on Artificial Intelligence, vol. 2, 1994, pp. 1371–1377, 1994.*

D.E. Moriarty and R. Miikkulainen, "Improving Game–Tree Search with Evolutionary Neural Networks," Proceedings of the First IEEE Conference on Evolutionary Computation. IEEE World Congress on Computational Intelligence, vol. 1, pp. 496–501, Jun. 1994.*

D.E. Moriarty and R. Miikkulainen, "Discovering Complex Othello Strategies Through Evolutionary Neural Networks," Connection Science, vol. 7, (3), 1995, pp. 195–209.*

Y.–S. Chen and T.–H. Chu, A Neural Network Classification Tree, Proceedings of the IEEE International Conference on Neural Networks, 1995, vol. 1, pp. 409–413, Dec. 1995.*

Skapura, "a connectionist approach to heuristically pruning large search trees," Masters thesis, University of Houston––Clear Lake, Nov. 1990.

Olson, "Learning to play games from experience: An application of artificial neural networks and tomporal difference learning," Masters thesis, Pacific Lutheran University, Dec. 1993.

Saylor & Stork, "Parallel analog neural networks for tree searching," American institute of physics, conference on neural networks for computing, Clark University, Dec. 1987.

Gherrity, "A game learning machine," Doctoral thesis, University of California San Diego, Dec. 1993.

* cited by examiner

Primary Examiner—George B. Davis
(74) Attorney, Agent, or Firm—Staas & Halsey LLP

(57) ABSTRACT

A problem solving unit for obtaining a solution in a symbol process in response to a given problem is provided with a learning control unit for making a neural network learn the solution output from the problem solving unit. The output in response to the given problem from the learned neural network is transmitted to the problem solving unit as a (first) hint on obtaining the solution to the problem. Furthermore, a second neural network for outputting a second hint is provided, selects either the first hint or the second hint, and provides the selection result to the problem solving unit.

21 Claims, 32 Drawing Sheets

| 2 | 8 | 3 |
|---|---|---|
| 1 | 6 | 4 |
| 7 | ▫ | 5 |

STARTING PATTERN

FIG. 1A

| 1 | 2 | 3 |
|---|---|---|
| 8 | ▫ | 4 |
| 7 | 6 | 5 |

GOAL PATTERN

FIG. 1B

STRUCTURE OF ENTRY ON TABLE

- OWN NUMBER
- DEPTH
- EVALUATION VALUE
- NUMBER OF PARENT NODE
- BLANK POSITION
- EXPANDED OR UNEXPANDED?
- PRESENT PATTERN (5X5)
  (-1 INDICATES OUTSIDE OF BOARD, AND D INDICATES BLANK)

EXAMPLE OF TABLE ENTRY

| 0 |
|---|
| 0 |
| 1 |
| -1 |
| 2,3 |
| TRUE |

| -1 | -1 | -1 | -1 | -1 |
|---|---|---|---|---|
| -1 | 1 | 2 | 3 | -1 |
| -1 | 4 | 5 | 6 | -1 |
| -1 | 7 | 0 | 8 | -1 |
| -1 | -1 | -1 | -1 | -1 |

| 1 |
|---|
| 1 |
| 4 |
| 0 |
| 3,3 |
| FALSE |

| -1 | -1 | -1 | -1 | -1 |
|---|---|---|---|---|
| -1 | 1 | 2 | 3 | -1 |
| -1 | 4 | 5 | 6 | -1 |
| -1 | 7 | 8 | 0 | -1 |
| -1 | -1 | -1 | -1 | -1 |

| 1 | 2 | 3 |
|---|---|---|
| 4 | 5 | 6 |
| 7 |   | 8 |

STARTING PATTERN

| 1 | 2 | 3 |
|---|---|---|
| 4 | 5 | 6 |
| 7 | 8 |   |

GOAL PATTERN

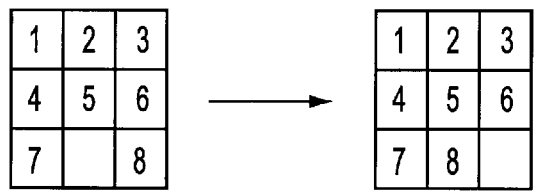
FIG. 13A
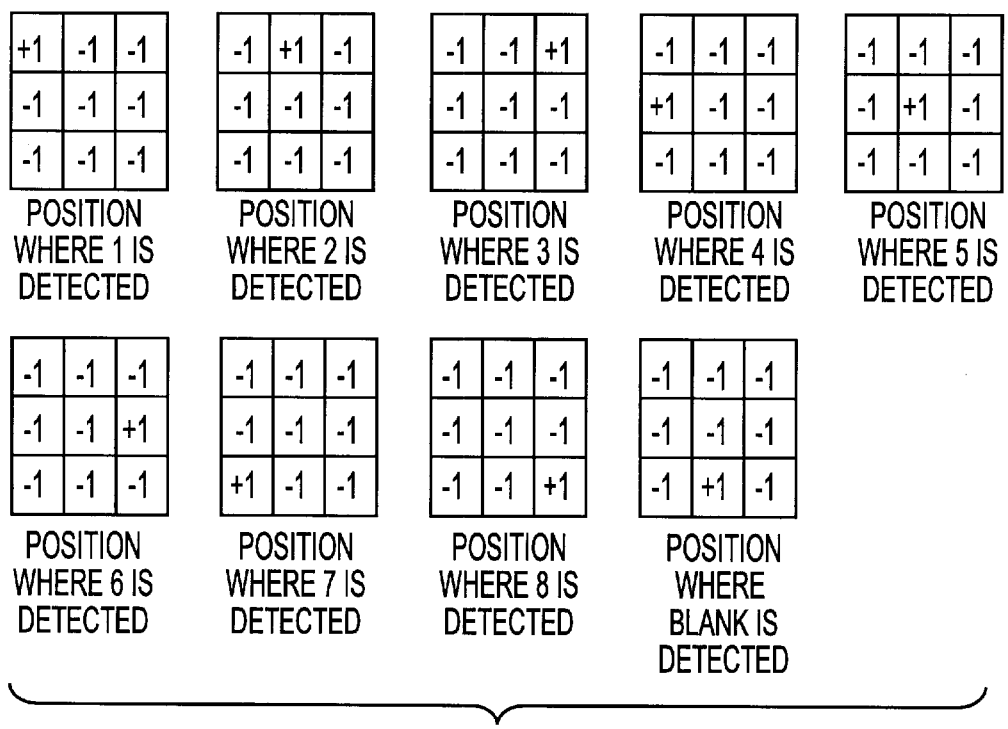
FIG. 13B
FIG. 13C

PROBLEM SOLVING APPARATUS HAVING LEARNING FUNCTION

BACKGROUND OF THE INVENTION

1. Field of the Invention

The present invention relates to a data processing unit, more specifically to a problem solving apparatus for processing symbols, and provides a learning function for the problem solving apparatus.

2. Description of the Related Art

In the field of artificial intelligence, most problem solving methods being developed are based on a trial-and-error search concept. That is, a problem is solved by searching for one solution in a space where the solution can exist. The present invention is based on a problem solving apparatus operated by a tree searching method in the symbol process.

The tree searching method in the symbol process is described below by referring to a simple example.

FIGS. 1A and 1B show an 8-tile puzzle. In this puzzle, there is an empty space of one frame and eight numbered tiles which are freely movable in the up, down, right, and left directions in a 3×3-block frame. When one of the numbered tiles above, below, right, and left of the space is moved into the space, the previous position of the moved number tile becomes the space. In other words, when the number tile is moved, the space appears to have moved.

In the 8-tile puzzle, a problem is that, for example, a starting pattern as shown in FIG. 1A is to be converted into a goal pattern as shown in FIG. 1B. Assuming that moving the space once is regarded as one step, a solution is obtained by tracing a path to the goal pattern shown in FIG. 1B in the smallest possible number of steps.

FIG. 2 shows an example of the result of the tree searching process to solve the problem shown in FIGS. 1A and 1B.

In the tree structure, one state of the arrangement of the numbered tiles in the 8-tile puzzle is referred to as a "node". That is, FIG. 1A shows the arrangement at a starting node, FIG. 1B shows the arrangement at a goal node. In the tree structure, each node has only one parent node except the starting node, which is a specific node having no parent node.

In the tree search, the efficiency of the searching process is greatly affected by the order from the starting node to the child nodes, that is, by how the nodes are expanded.

The order can be determined by, for example, a breadth-first method, a depth-first method, etc.

FIG. 2 shows a result of the breadth-first method. In the breadth-first method, nodes are sequentially expanded in the order in which the nodes were generated. In FIG. 2, the three child nodes 2, 3, and 4 are generated from the starting node 1. That is, the nodes are first generated in the horizontal direction by priority, and the nodes in the first row (depth 1), second row (depth 2), . . . are generated in this order.

On the other hand, the last generated node is first expanded in the depth-first method. That is, nodes are generated in the order from the starting node 1 to nodes 2, 5, 10, 20, 11, 21, . . . That is, the nodes are expanded in the vertical direction by priority.

In FIG. 2, the goal node is obtained as a child node to node 26, and the solution path to the problem shown in FIGS. 1A and 1B in the 8-tile puzzle is indicated by bold lines. By moving the space 5 times (in 5 steps), the starting pattern (FIG. 1A) is converted into the goal pattern (FIG. 1B), and the goal node cannot be reached with a smaller number of times of moving the space.

FIG. 3 is a block diagram showing the configuration of the conventional problem solving apparatus operated in a symbol process.

In FIG. 3, a problem is generated by a problem generating apparatus 101, and the generated problem is provided for the problem solving apparatus 100.

The problem solving apparatus 100 performs the problem solving process as shown in FIG. 2 until a solution can be obtained through a tree search, and comprises a node expanding apparatus 102 and a node evaluating apparatus 103.

The node expanding apparatus 102 generates a child node from a parent node, that is, it expands nodes.

The node evaluating apparatus 103 evaluates the node expanded by the node expanding apparatus 102 as to whether or not the node refers to a goal node.

The processes of the node expanding apparatus 102 and node evaluating apparatus 103 are repeated until the solution is successfully obtained.

However, if a random searching method is followed by either the depth-first method or breadth-first method in the tree search, then the process of detecting a path to the goal node refers to a wasteful process. When the number of nodes expanded before the optimum path is detected is too large, a considerably long time and a large amount of stored information are spent on the search.

Conventionally, a solution can be obtained in a reduced search space and in a reasonable time by introducing information indicating the rule of thumb, that is, information referred to as heuristic knowledge. The word "heuristic" means "serving to discover". The heuristic information is used to help a goal node be reached in the search by extending the most probable node first from experience.

In using the above described method, it is necessary for a user to appropriately detect the required heuristic knowledge and provide it to a problem solving apparatus, involving a great expenditure of labor and time.

Furthermore, in solving a problem already solved, the conventional problem solving apparatus again requires the process time spent in practically solving the problem first. That is, a problem similar to a problem solved already, requires the same process time, without shortening it.

SUMMARY OF THE INVENTION

The present invention aims at providing a problem solving apparatus having a learning function. The problem solving apparatus obtains a solution in a reasonable time without heuristic knowledge or through simple heuristic knowledge and obtains a solution within a short when solving the problem based on the leaving result of the already solved problem.

The problem solving apparatus having the learning function according to the present invention includes a problem solving unit for obtaining a solution in a symbol process upon receipt of a given problem, a (first) associative storage device for providing a (first) hint on solving the problem for the problem solving unit, and a learning control unit for making the (first) associative storage device perform a learning process.

The present invention can further include a second associative storage device for outputting a second hint on solving the problem upon receipt of the given problem, and a selecting unit for selecting the first hint output by the first associative storage device or the second hint output by the second associative storage device, and providing the selected hint for the problem solving unit.

When the problem solving unit of the above described problem solving apparatus receives a problem similar to a problem already solved, it obtains a solution within a short time by receiving a hint on solving the problem based on the learning result of the problem already solved.

BRIEF DESCRIPTION OF THE DRAWINGS

FIGS. 1A and 1B show examples of an 8-tile puzzle problem;

FIGS. 13A, 13B, and 13C show practical examples of converting data into a representation for input to a neural network;

DESCRIPTION OF THE PREFERRED EMBODIMENT

The embodiments of the present invention are described below by referring to the attached drawings.

In the following description of the embodiments, the above described "space" may be referred to as a "blank".

Figure 4:
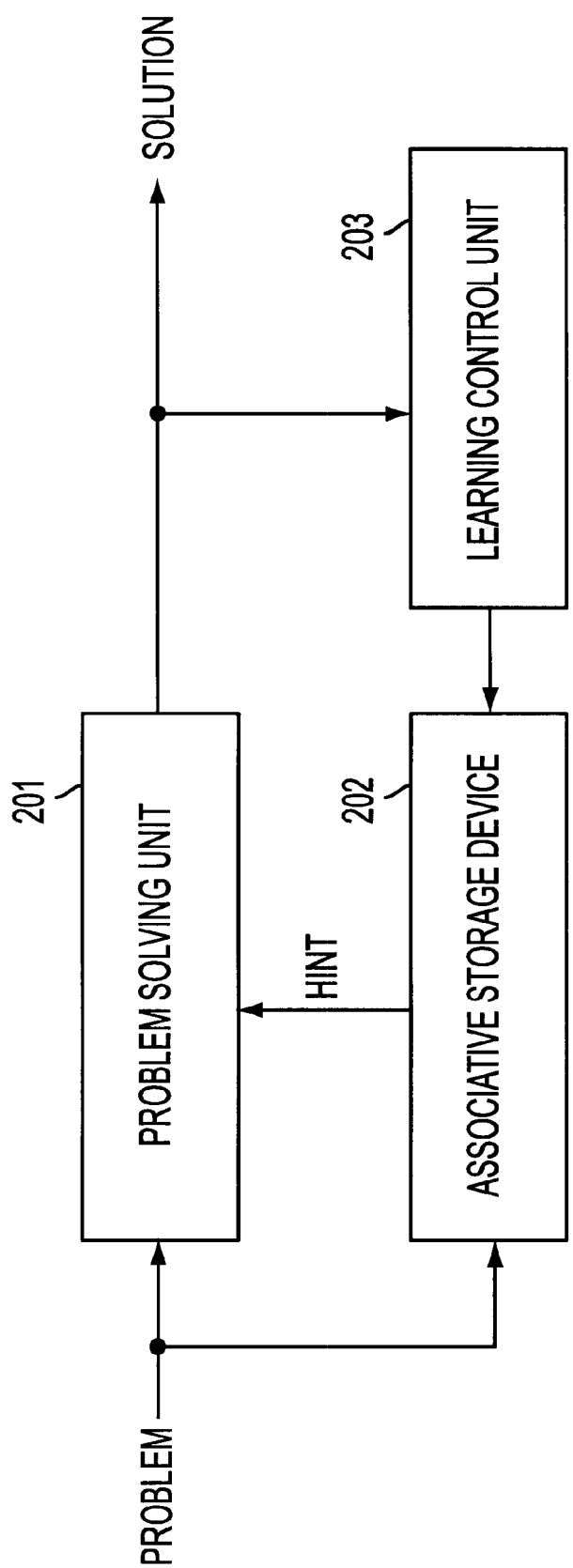
FIG. 4 is a block diagram showing the principle of the problem solving apparatus according to the first embodiment of the present invention.

FIG. 4 is a block diagram showing the principle according to the first embodiment of the present invention.

FIG. 4 shows the principle of the problem solving apparatus for solving a given problem through a tree search in a symbol process, and the problem solving apparatus has a learning function.

In FIG. 4, a problem solving unit 201 receives a given problem and obtains a solution in a symbol process. For example, it obtains a solution through a tree search.

An associative storage device 202 comprises, for example, a hierarchical neural network, receives a given problem, and provides a hint on obtaining a solution to the problem for the problem solving unit 201.

A learning control unit 203 makes the associative storage device 202 perform a learning process using the solution output from the problem solving unit 201.

The problem solving unit 201 comprises a problem solving apparatus for performing, for example, a symbol process according to the first embodiment of the present invention. Then, the associative storage device 202 comprising, for example, a neural network outputs a hint on obtaining a solution, and the hint is used as follows.

Figure 3:
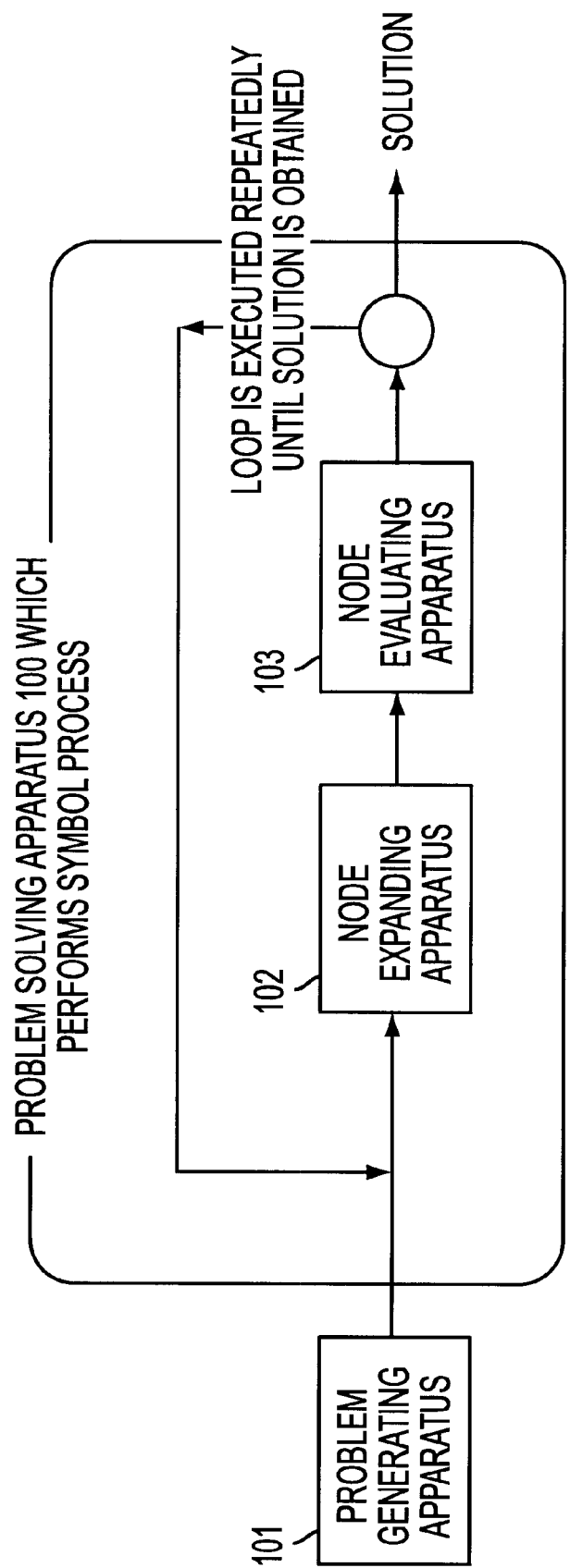
FIG. 3 is a block diagram showing the configuration of the problem solving apparatus in the conventional symbol process.

The problem solving apparatus for performing the symbol process through the problem solving unit 201 comprises a node expanding apparatus and a node evaluating apparatus as in the conventional example shown in FIG. 3. In the present embodiment, the above described breadth-first method and depth-first method are replaced by a method using, for example, evaluation functions.

A method using evaluation functions (best-first method) is a well-known method. The references are listed below. "Artificial Intelligence—Theory of System for solving a problem" written by N. J. Nilsson, translated by Shuhei Goda, and Kazuhiko Masuda, published in 1973 by Colona; originated from "Problem-Solving Methods in Artificial Intelligence" by Nils J. Nilsson, 1971, McGRAW-HILL BOOK CO., INC.

For example, in a node expanding apparatus, a node having the smallest evaluation function in unexpanded nodes (that is, the nodes whose child nodes have not been obtained) is selected, and the position of a blank (space) is shifted. Based on the result, the node evaluating apparatus obtains an evaluation function for the child node. The evaluation function is computed by a predetermined equation.

When the output from the associative storage device 202, for example, a neural network, to an expanded node matches the output from the node expanding apparatus (that is, when the hint as to in which direction the position of the blank should be shifted (for example, a new position of the blank) matches the child node as a blank position shift result), the difference obtained by subtracting a predetermined value from a result of the above described equation is defined as an evaluation function for the child node.

When the arrangement of the blank position shift result matches the hint output from the associative storage device 202, there is a high possibility of selecting a node that matches the hint in the next step (loop). That is, the result of the learning performed through the neural network is effective in detecting the optimum path in the tree searching process.

The processes performed by the node expanding apparatus and node evaluating apparatus are similarly repeated as shown in FIG. 3. When a solution is detected, the learning control unit 203 performs a learning process through the associative storage device 202 using the solution. In this learning process, a common back-propagation method is used.

As described above, a problem solving apparatus having a learning function is designed through a neural network according to the present invention.

Figure 5:
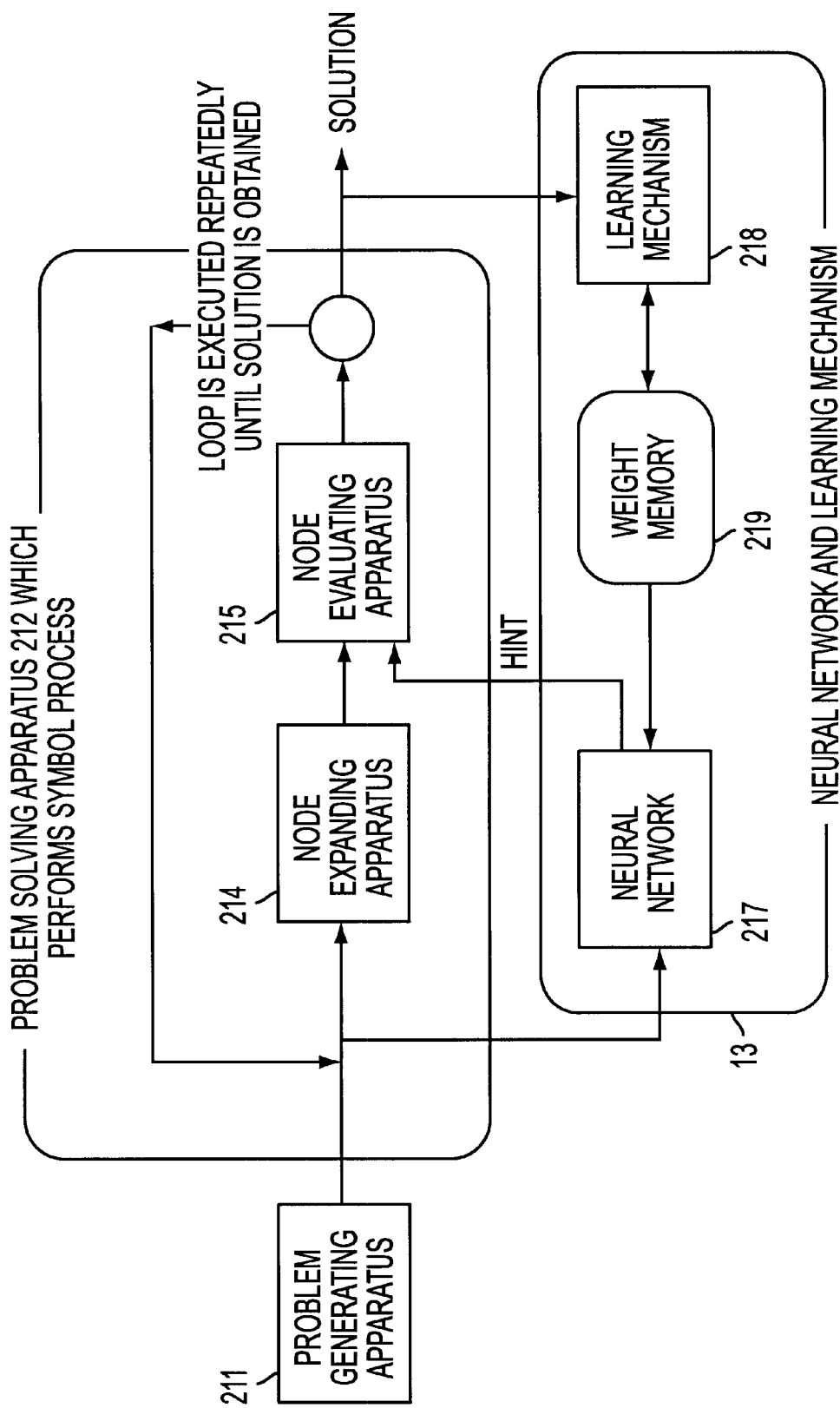
FIG. 5 is a block diagram showing the configuration of the problem solving apparatus having the learning function according to the first embodiment of the present invention.

FIG. 5 is a block diagram showing the configuration of the problem solving apparatus having the learning function according to the first embodiment of the present embodiment.

In FIG. 5, the problem solving apparatus having the learning function comprises a problem generating apparatus 211, a problem solving apparatus 212 for performing a symbol process, and a neural network and learning mechanism 213.

The problem solving apparatus 212 comprises a node expanding apparatus 214 and a node evaluating apparatus 215 as in the conventional example shown in FIG. 3. The present embodiment is different from the conventional method in that a node is expanded and evaluated using an evaluation function based on a predetermined equation.

The neural network and learning mechanism 213 comprises a 3-layer hierarchical neural network 217, a learning mechanism 218 for controlling the learning process performed by the neural network 217 using a solution output by the problem solving apparatus 212, and a weight memory 219 for storing the weight for the neural network 217.

Figure 6:
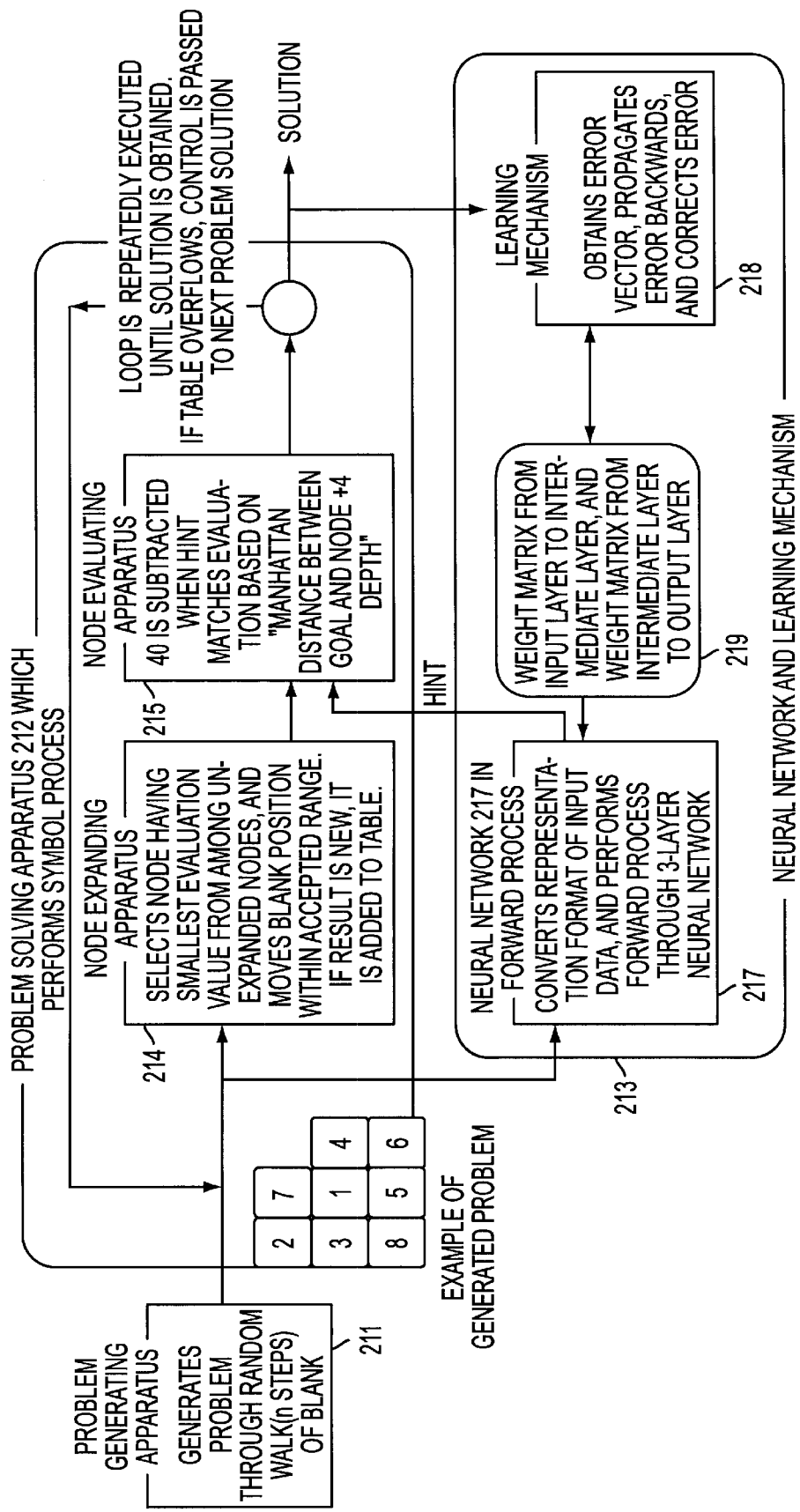
FIG. 6 shows the operations of the problem solving apparatus having a learning function for the 8-tile puzzle according to the first embodiment of the present invention.

FIG. 6 shows the operations performed by the problem solving apparatus having a learning function in the 8-tile puzzle as shown in FIG. 5.

In FIG. 6, the problem generating apparatus 211 generates a problem by shifting a space at random (n steps). The problem is provided for the node expanding apparatus 214 in the problem solving apparatus 212 for performing a symbol process, and for the neural network 217 in the neural network and learning mechanism 213.

The node expanding apparatus 214 selects a node having the smallest evaluation function (described later) of all unexpanded nodes and shifts the position of the blank based on the selection result. After the shift, unless the arrangement of the number tile corresponding to the child node of the selected node has not appeared so far in the process, the data on the arrangement is added to the table. The storage of the data on the table is described later.

The neural network 217 performs a forward process in response to the output from the problem generating apparatus 211, and the result is output as a hint to the node evaluating apparatus 215. In the forward process performed by the neural network 217, the representation of input data is converted and the forward process is performed through the 3-layer neural network. The conversion of the representation is described later.

The node evaluating apparatus 215 obtains the evaluation function corresponding to an expanded node. According to the present embodiment, a calculation is made by the following equation (1) using an evaluation function d.

$$d = \text{Manhattan distance from goal pattern} + (4 \times \text{depth}) \quad (1)$$

Figure 2:
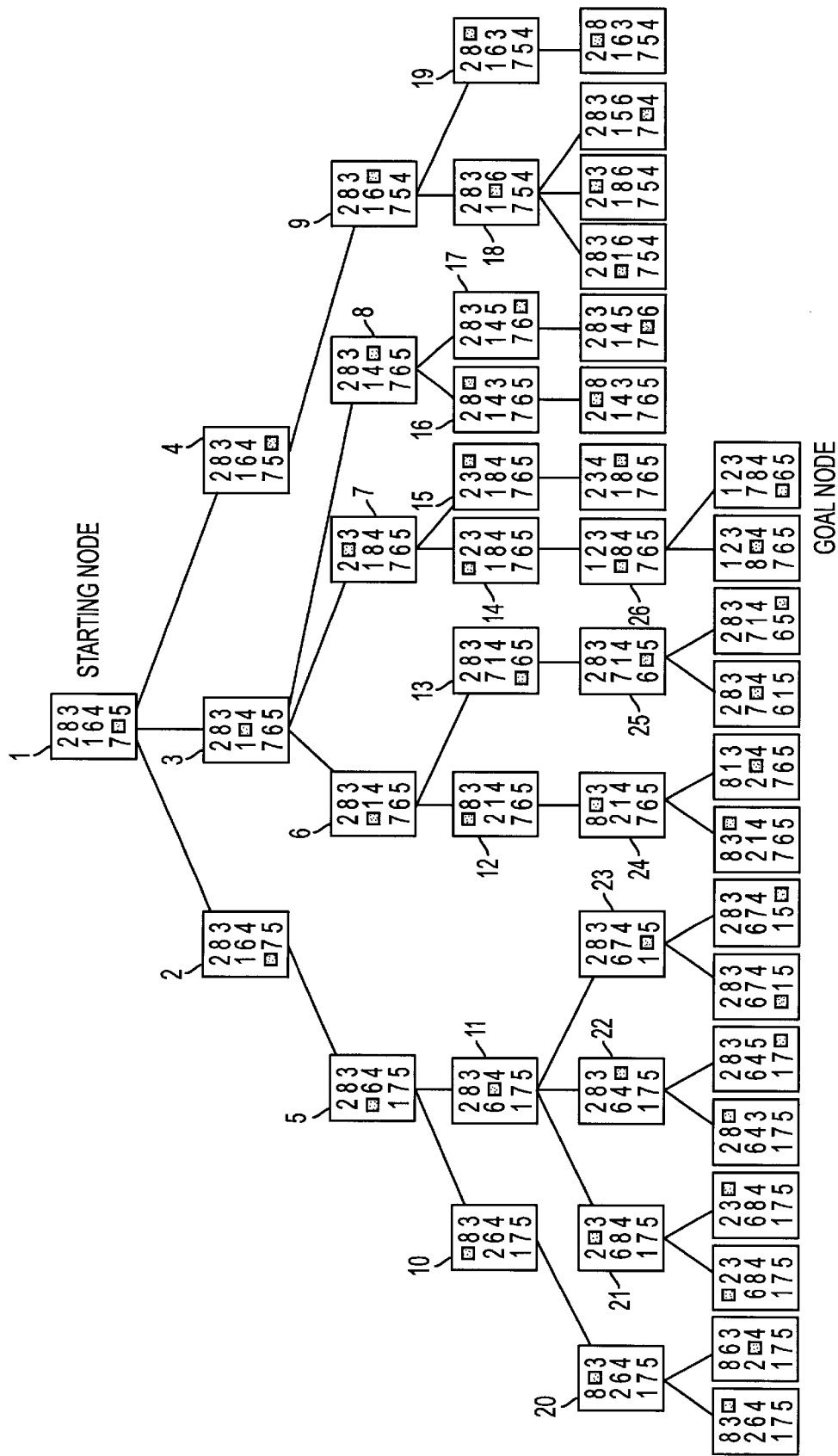
FIG. 2 shows a result of a tree search in response to the problem shown in FIGS. 1A and 1B.

(where the Manhattan distance indicates $|x_1-x_2|+|y_1-y_2|$ between the two points $(x_1, y_1)$ and $(x_2, y_2)$. In the above equation, the sum of the Manhattan distances of the same numbered tiles (excluding a blank) between the present pattern and the goal pattern is defined as the (modified) Manhattan distance to the goal pattern. The depth indicates the ordinal number of row of the node evaluated from the starting node shown in FIG. 2.)

When the child nodes output from the node expanding apparatus 214 match the hint as an output from the neural network 217, that is, when the child nodes as a result of the shift of the position of the blank match the output from the neural network, the node evaluating apparatus 215 outputs as an evaluation function a value obtained by subtracting, for example, 40 from the evaluation function given by the above equation. If the output values do not match each other, the evaluation function in the above equation is used unchanged as an evaluation function.

The value 40 mentioned above is a value obtained by the Inventor from experience with the 8-tile puzzle according to the present embodiment, and corresponds to the depth 10 (the depth 10×4=40 is computed by the above listed equation (1)). The Inventor also has disclosed from experience that the depth is not limited to 10, but an appropriate value of the depth can be 10 through 15. Therefore, the value subtracted from the evaluation function is about 40 through 60. In the present embodiment, 40 is subtracted from the evaluation function.

Until the solution is obtained, that is, until the goal node is detected, the node expanding apparatus 214 continues to shift the position of the blank and, correspondingly, the node evaluating apparatus 215 repeats the calculations for an evaluation function. When a goal node is reached, the path to the goal node is output as a solution. If the number of nodes expanded until the solution is obtained is considerably large and the table described later overflows, that is, the data overflows the storage area for storing data on the arrangement of the numbered tiles of the child nodes obtained as a shift result, then the next problem is processed without searching for the solution to the present problem.

When the path to the goal node, that is, the solution, is detected, the neural network 217 performs a learning process corresponding to each step for the solution. The learning process is controlled by the learning mechanism 218. In the learning process, data corresponding to parent nodes in each step in the path is provided for the input layer unit in the neural network 217. Data corresponding to a child node at each parent node in each step in the path is provided as teaching data to the output layer. Then, the weight is amended according to the common back-propagation method, and the weight value is stored in the weight memory 219 and provided for the neural network 217.

Figure 7:
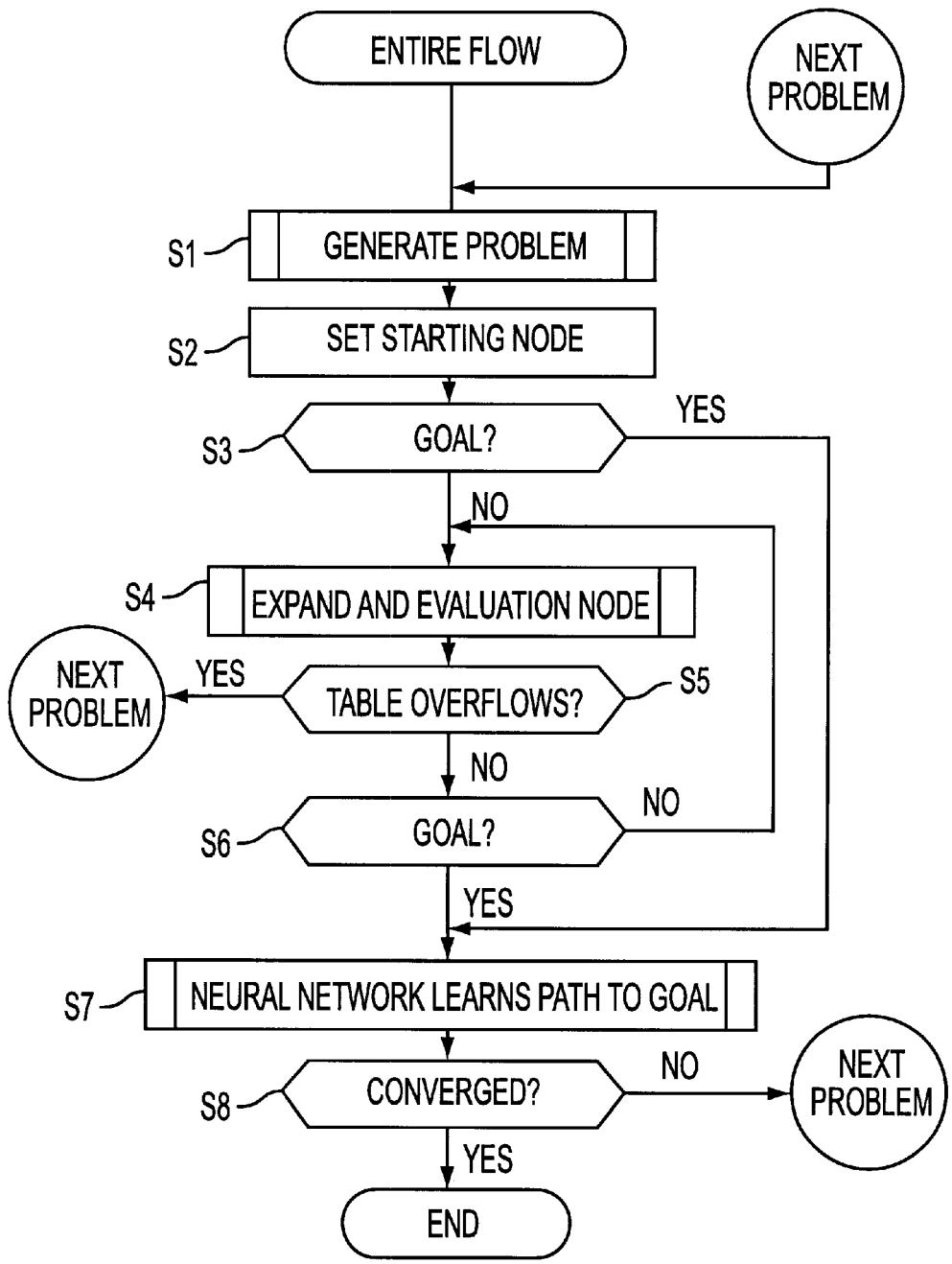
FIG. 7 is a flowchart showing the entire process of the problem solving apparatus according to the first embodiment of the present invention.

FIG. 7 is a flowchart showing the entire process performed by the problem solving apparatus according to the present invention.

When the process starts as shown in FIG. 7, a problem is generated in step S1. This generating process is described later. Then, in step S2, the starting node is set and it is determined whether or not a goal node has been reached in step S3.

Since the goal node has not been reached yet at first, a node expanding and evaluating process is performed in step S4. This process is also described later. It is determined in step S5 whether or not the table has overflowed. Since it is determined at first that the table has not overflowed, the determination as to whether or not the goal node has been reached is made in step S6. Since it is determined that the goal node has not been reached yet, control is returned to the processes in and after step S4.

If it is determined in step S6 or S3 that the goal node has been reached, then a learning process is performed in step S7 on the path to the goal, that is, on a solution. This process is also described later. If it is determined in step S8, based on the error level, whether or not the learning process has converged, and if it is determined that the learning has converged, then the process terminates.

If it is determined in step S5 that the table has overflowed before the goal node has been reached, or if it is determined in step SB that the learning through the neural network has not converged, then the solution of the problem or the learning of the solution are interrupted and the processes in and after step S1 are repeated to solve the next problem.

Before explaining in detail the process shown in FIG. 7, the storage contents of the table, which stores the information about the arrangement of a new number tile (child node) each time it appears, is described.

Figures 8A, 8B, 8C:
FIGS. 8A, 8B, and 8C show the contents of the table for storing the information about the arrangement about numbered tiles.

FIGS. 8A through 8C show the contents of the search node table storing the information about the arrangement of numbered tiles.

FIG. 8A shows an example of the structure of the entry of the above described search node table. The structure of the entry corresponds to the number of the entry, that is, an assigned number, the depth of a corresponding node, the evaluation function for the node, the number of a parent node, the position of a blank, an expansion state (expanded or unexpanded), and the arrangement of numbered tiles (an arrangement of 5×5).

FIG. 8B shows the starting pattern and goal pattern to practically explain the storage contents of the entry. In this example, extremely simple starting and goal patterns are illustrated. That is, in this example, a goal pattern is reached only in one step of shifting the blank in the starting pattern to right.

FIG. 8C shows an example of the contents of the entry of the table for each of the above described patterns. In FIG. 8C, the number of the entry for the starting pattern is "0" and the depth of the corresponding node is "0". An evaluation function is "1" which is only the Manhattan distance. Since the present node is a starting node, the number of a parent node is "−1". The horizontal and vertical positions of the blank are "2" and "3" respectively, and the determination as to whether or not the nodes are expanded indicates "True".

The contents of the entry corresponding to the goal pattern are similarly defined. The above described evaluation function is "4" with the Manhattan distance and the depth of the corresponding node set to 0 and 1 respectively because it refers to a goal node. The number of the parent node is "0" corresponding to the starting pattern.

Figure 9:
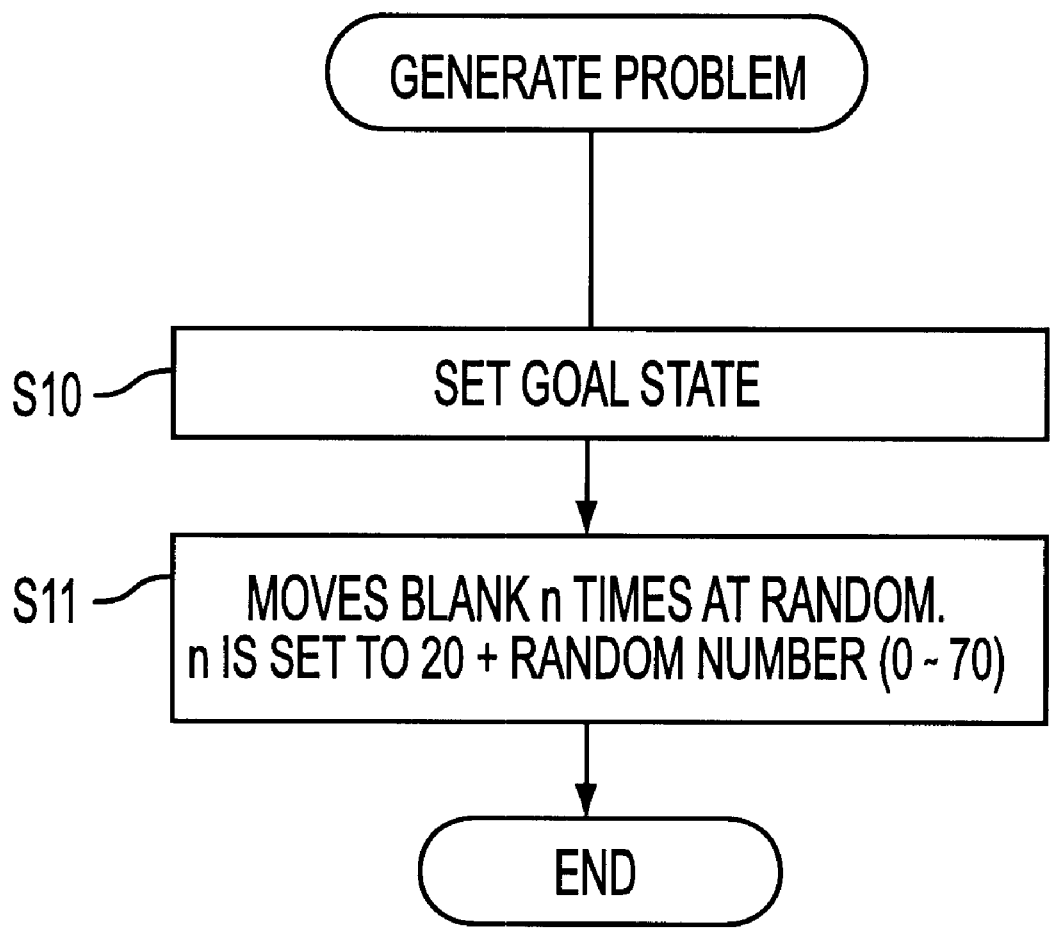
FIG. 9 is a flowchart showing the problem generating process.

FIG. 9 is a flowchart showing the problem generating process in step S1 shown in FIG. 7.

When the process starts as shown in FIG. 9, the goal pattern is set in step S10, and the blank is shifted n times at random in step S11, thereby determining a starting state and generating a problem. The value n is selected from, for example, among 20+random numbers (uniform random numbers 0 through 70), and obtains the resultant range of 20 through 90.

Figure 10:
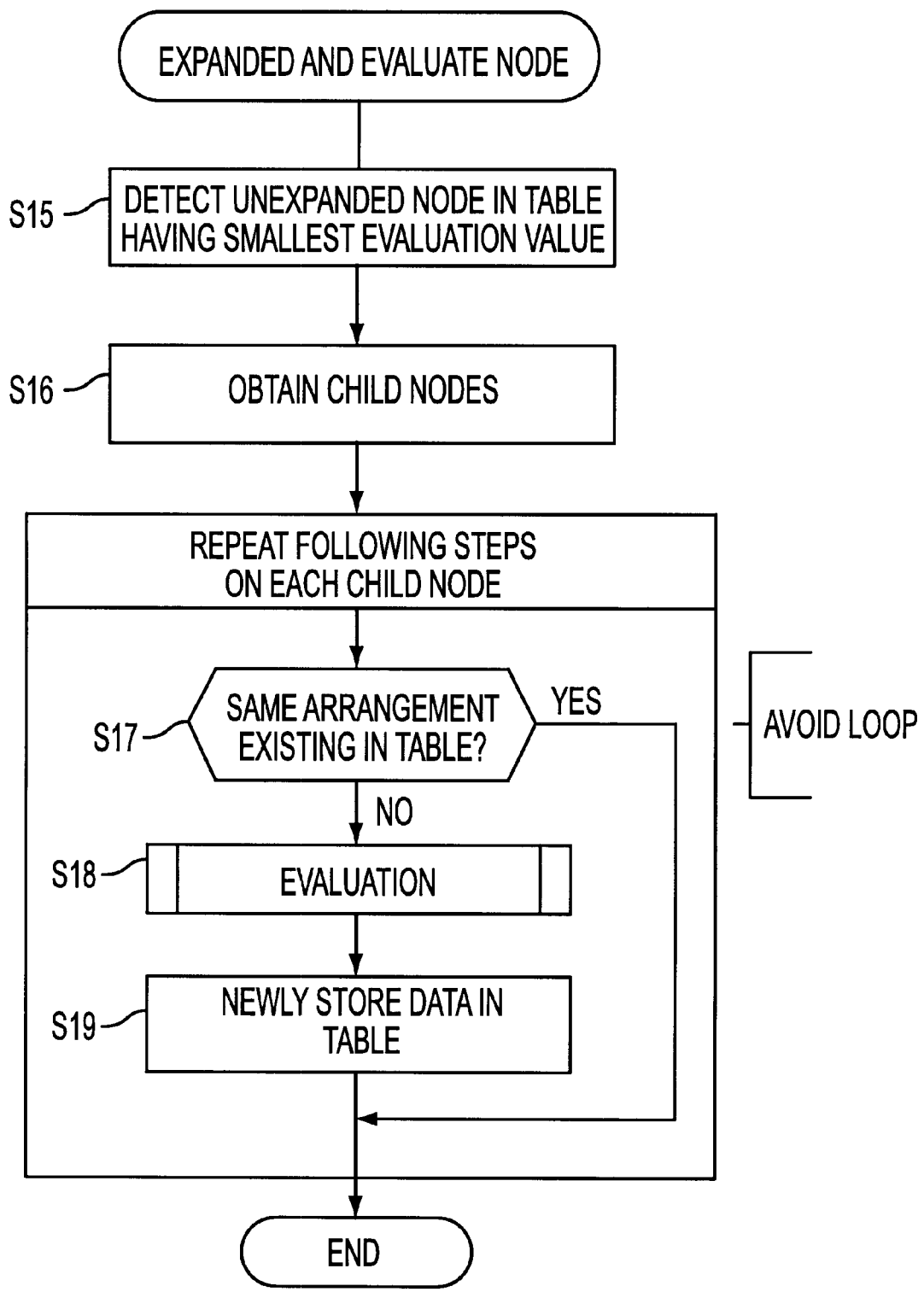
FIG. 10 is a flowchart showing the node expanding process.

FIG. 10 is a flowchart showing the node expanding and evaluating process.

When the process starts in FIG. 10, a node which has not been expanded and has the smallest evaluation function is detected in step S15. In step S16, normally a plurality of child nodes to the detected node are obtained. The processes in steps S17 through S19 are repeated for each child node, thereby terminating the process.

In step S17, it is determined whether or not the same arrangement of numbered tiles as that of the obtained child node exists in the search node table. If not, an evaluating process, that is, a process of obtaining an evaluation function, is performed in step S18. Based on the result, in step S19, the data corresponding to the child node is newly stored in the table. The evaluation process in step S18 is described later.

When it is determined in step S17 that the same arrangement of numbered tiles exists in the search node table, no process is performed on the child node of the detected node, and control is passed to another child node to avoid a loop in a tree search process. That is, a node is not selected by the node expanding apparatus 214 shown in FIG. 6 if the process in step S18 is not performed on such child nodes, or if those nodes are not evaluated. As a result, a loop can be avoided.

Figure 11:
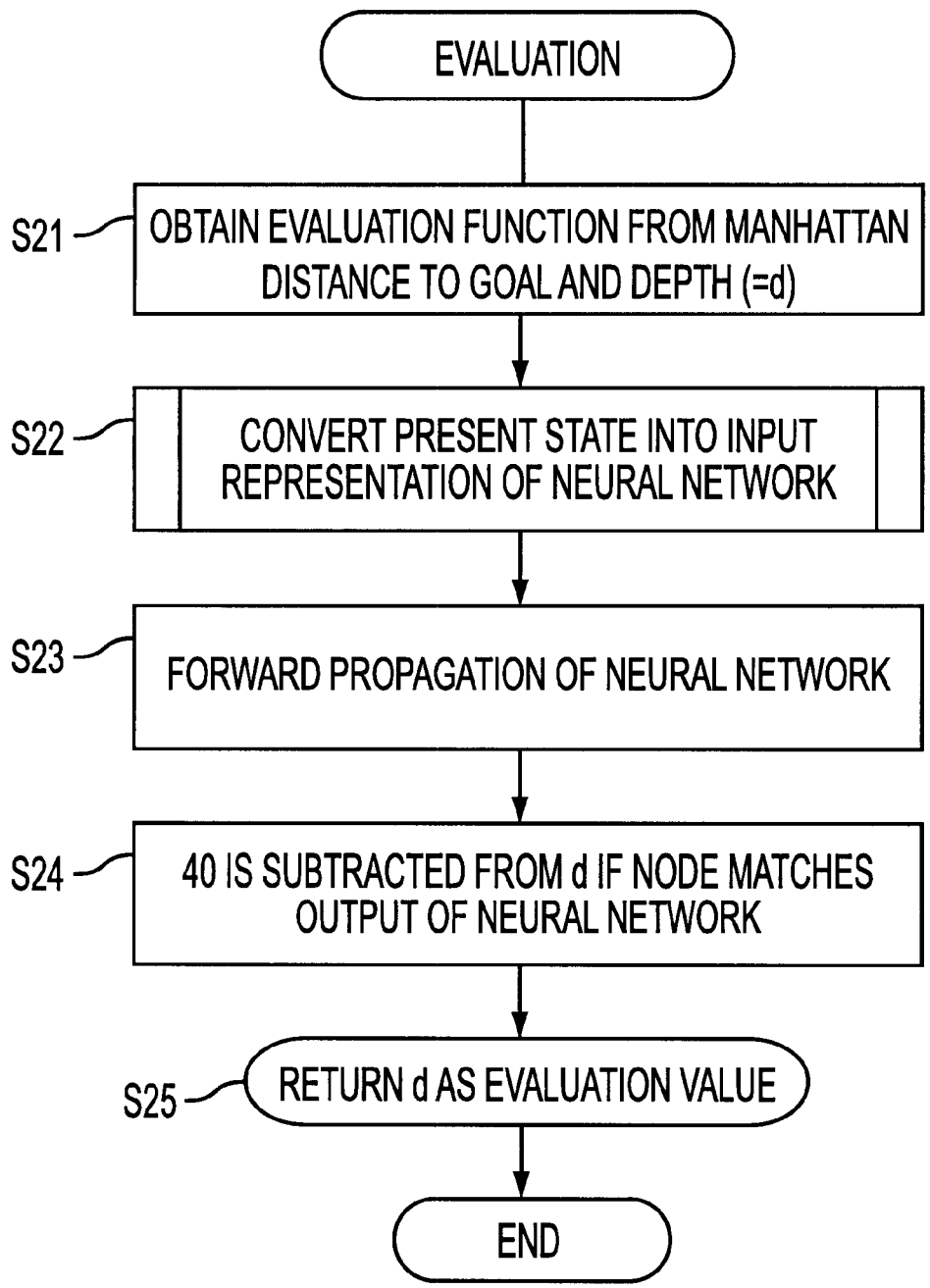
FIG. 11 is a flowchart showing the evaluating process according to the first embodiment of the present invention.

FIG. 11 is a flowchart showing the evaluation process in step S18 shown in FIG. 10.

When the process starts as shown in FIG. 11, an evaluation function "d" is obtained by the above described equation (1) based on the Manhattan distance and depth in step S21. In step S22, the present pattern is obtained, that is, the pattern of the parent node is converted into an input representation of the neural network. The conversion process is described later.

In step S23, a forward process is performed through the neural network. In step S24, when a child node to a parent node practically matches the hint output from the neural network, 40 is subtracted from "d" in the child node. The resultant value "d" is returned as the value of the evaluation function, and the process terminates.

Figure 12:
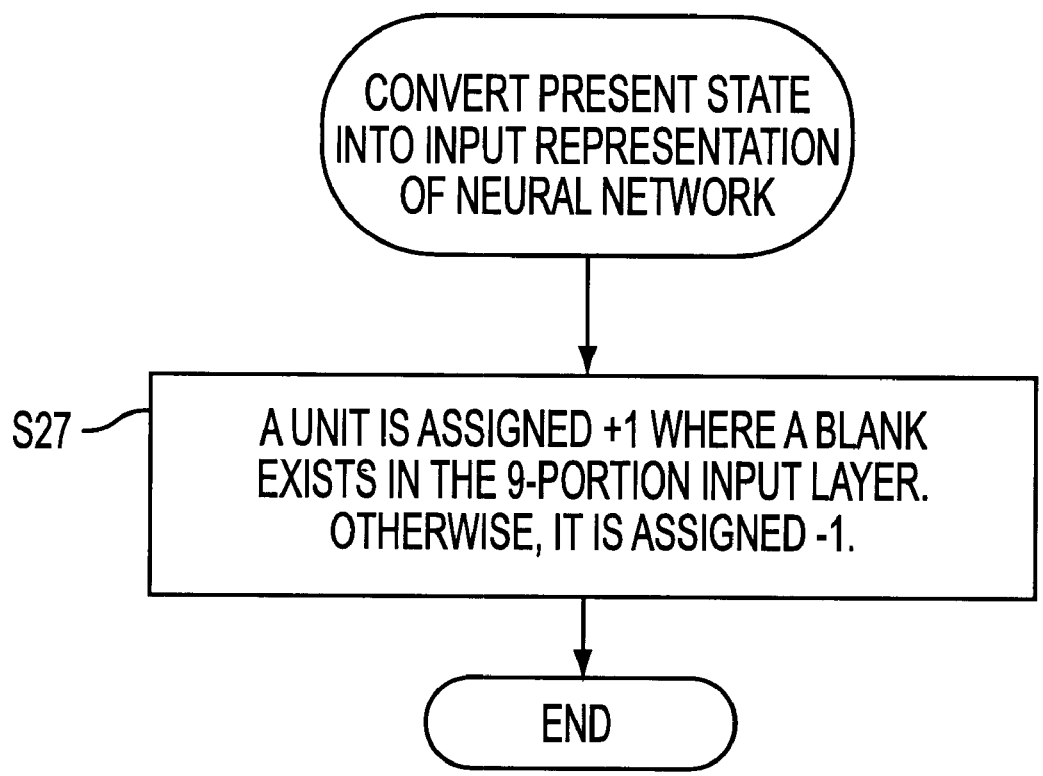
FIG. 12 is a flowchart showing the process of converting data into a representation for input to a neural network.

FIG. 12 is a flowchart showing the process of converting data into an input representation for the neural network in step S22.

In step S27 shown in FIG. 12, a unit is assigned +1 where a blank exists in the 9-portion input layer. Otherwise, it is assigned −1.

FIGS. 13A, 13B, and 13C show examples of the process in step S27 in FIG. 12. FIG. 13B shows the detected portion of each number tile, that is, an input value to an input layer unit corresponding to the parent node when the position of the blank at (2, 3) is shifted to the position (3, 3) as shown in FIG. 13A. FIG. 13C shows an output value from the output layer unit.

Figure 14:
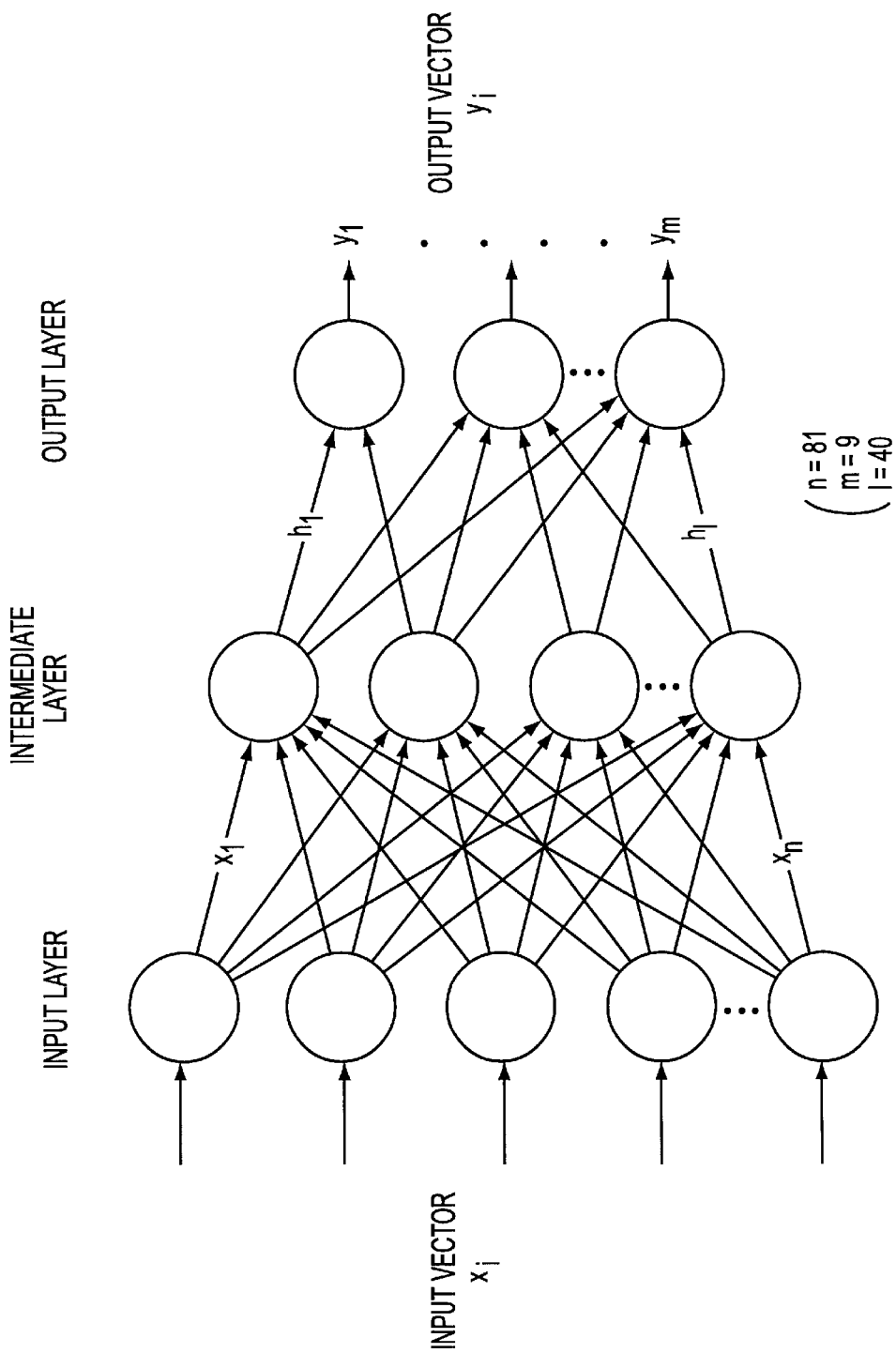
FIG. 14 shows the 3-layer hierarchical neural network.

According to the present embodiment and the second embodiment described later, a 3-layer hierarchical neural network as, for example, shown in FIG. 14, is used as the neural network 217 shown in FIG. 6.

The number n of units in the input layer is 81 in the neural network shown in FIG. 14. 9 units are provided for each of the numbered tiles (1, 2, 3, 4, 5, 6, 7, and 8) and the blank. Each of the 9 units corresponds to the numbered tile and the position of the blank to be detected before the shift of the blank. For example, an input value of +1 is assigned only to the unit, of the 9 units for use in detecting the position of the number tile 1 in the input layer units, corresponding to the position of the number tile 1 as shown in FIG. 13B. All the other units are assigned −1. An input value of +1 is assigned only to the unit, of the 9 units for use in detecting the position of the numbered tile 2, corresponding to the position of the number tile 2, and all the other units are assigned −1. The input number 1 of each of the other numbered tiles is similarly assigned.

The neural network shown in FIG. 14 is a 3-layer hierarchical neural network. Each unit is completely coupled to the other units between the layers. The number 1 of the units in the intermediate layer can be 30 through 90. It can be, for example, 40 according to the rule from experience that a half of the number of units in the input layer is appropriate.

On the other hand, the number m of the units in the output layer is 9, and, as shown in FIG. 13C, the learning process through the neural network is performed by providing teaching data so that the output from the unit corresponding to a new blank position can be +0.9 and the outputs from the other 8 units can be −0.9 Since the blank is shifted upwards, downwards, to the left, or to the right, the number of units in the output layer can be 4 for the 4 directions.

Figure 15:
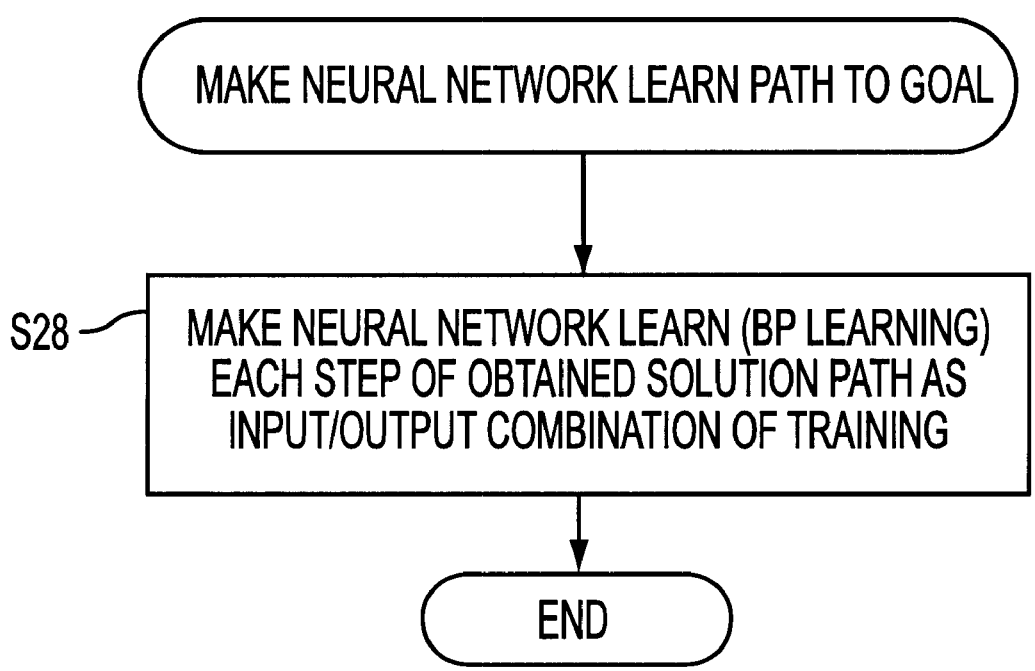
FIG. 15 is a flowchart showing the solution learning process through the neural network.

FIG. 15 shows the process of making the neural network learn the path to the goal shown in step S7 in FIG. 7.

In FIG. 15, the arrangement of the numbered tiles of the parent node in each step of the path obtained as solutions, and the blank shift results are provided as the learning data for the neural network in step S28, thereby performing back-propagation learning.

Figure 16:
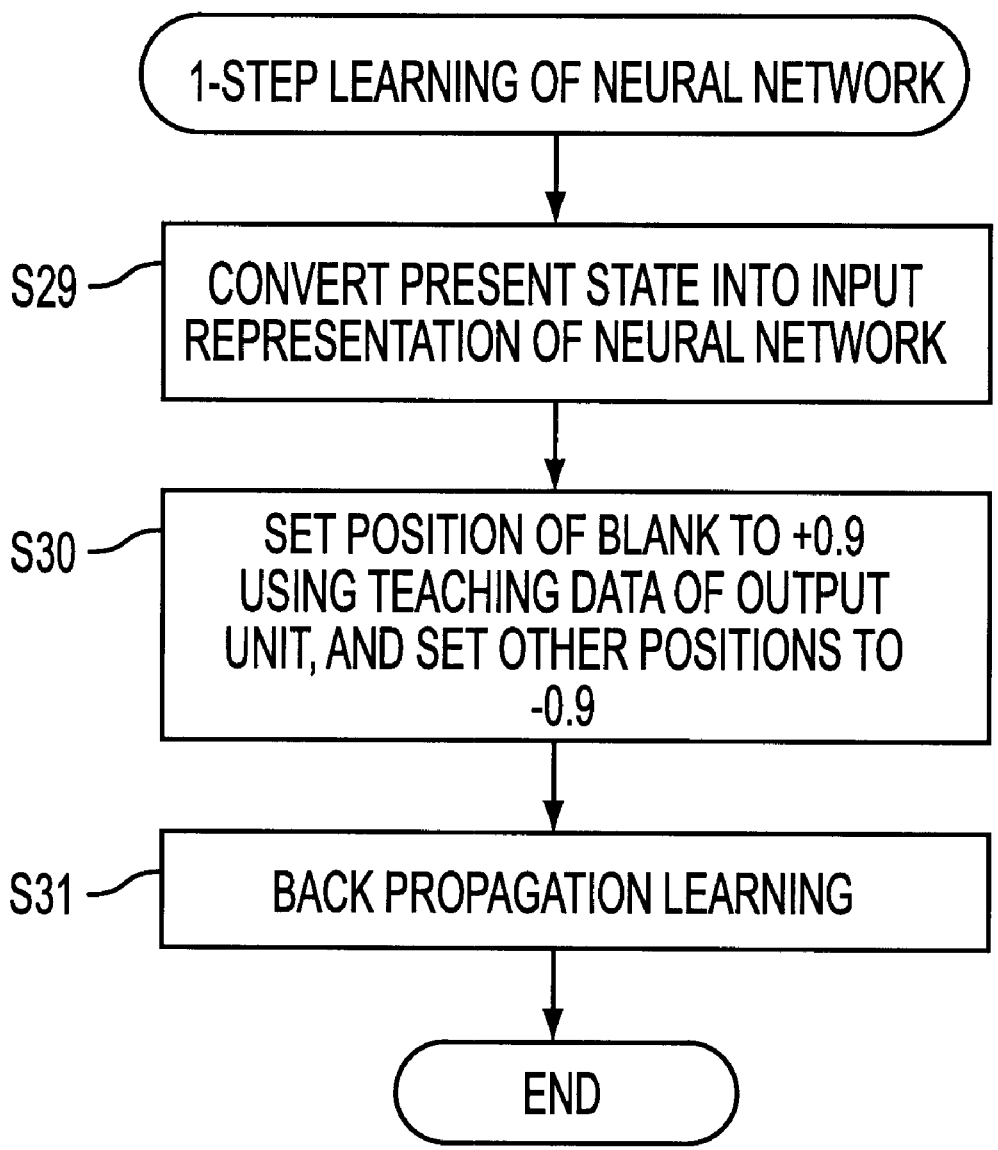
FIG. 16 is a flowchart showing the 1-step learning process through a neural network.

FIG. 16 is a flowchart showing the process of having the neural network perform a 1-step learning process as shown in FIG. 15. When the process starts as shown in FIG. 16, the process shown in FIG. 12, that is, the process of converting the current state into an input representation of a neural network is performed (S29).

In the subsequent step S30, a process of inputting a value as teaching data to obtain an output value 0.9 of the output unit corresponding to the new blank position and the output values −0.9 of all the other units are performed. The weight is amended in the back-propagation process in step S31, thereby terminating the 1-step process.

An example of a relatively small scale search tree is described as follows.

Figure 17:
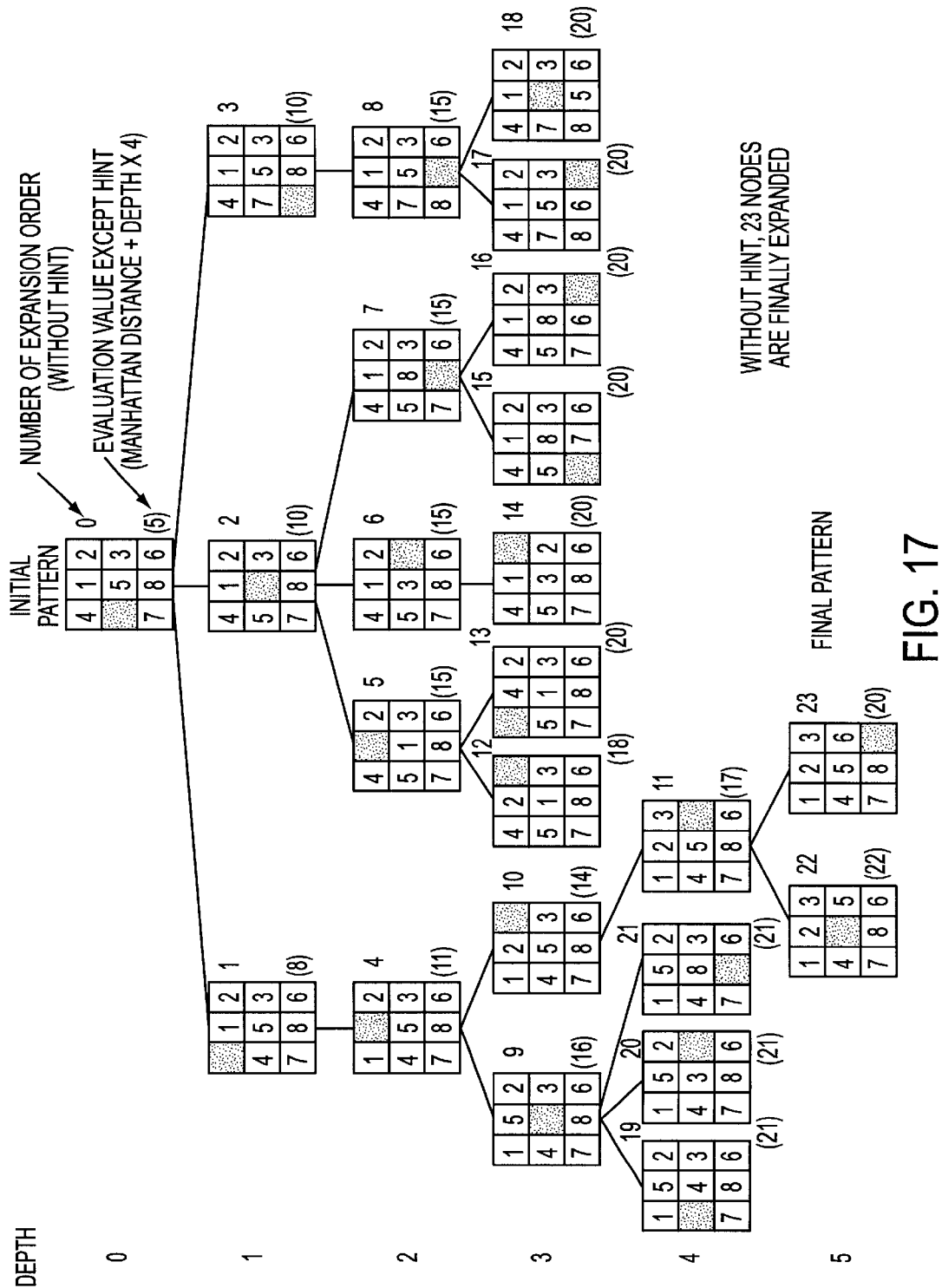
FIG. 17 shows an example of expanding a node using an evaluation function in a relatively small search tree.
Figure 18:
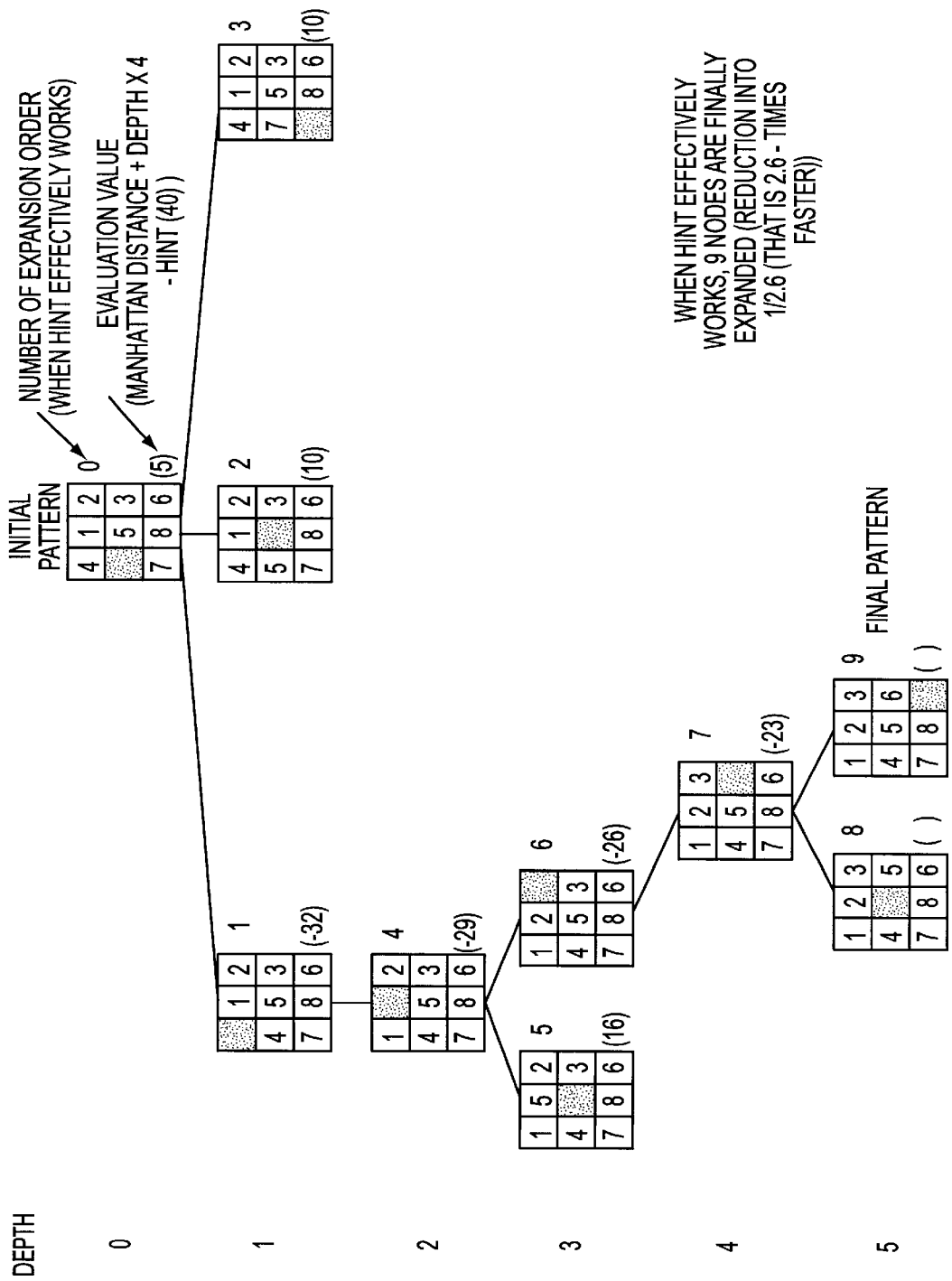
FIG. 18 shows an example of expanding a node when the present invention is applied to the example shown in FIG. 17.

FIG. 17 shows an example of expanding nodes in a method in which an evaluation function in equation (1) is used without a hint on solving an 8-tile puzzle problem. FIG. 18 shows an example of expanding a node in a method according to the present invention in which an evaluation function and a hint are used in solving the same problem as that shown in FIG. 17.

In FIGS. 17 and 18, the arrangements of the numbered tiles 1 through 8 (and the blank which indicates the blank frame) are assigned to each node. The expansion order is given at the top right of each node, and the evaluation value of each node is given in parentheses at the bottom right of each node.

First, as shown in FIG. 17, the child node (depth 1) to the parent node indicating the initial pattern (expansion number 0) is expanded. That is, the nodes having the expansion numbers 1, 2, and 3 are expanded. Next, a node having the smallest evaluation function is selected from among unexpanded nodes. The selected node is expanded and its child node is obtained. At this stage, the nodes assigned the expansion order numbers 1, 2, and 3 are unexpanded. Among these nodes, the node having the smallest evaluation function is assigned the expansion order number 1, and the child node to this node is expanded. In this example, the only child node to the node having the expansion order number 1 is assigned the expansion order number 4.

Similarly, the node having the smallest evaluation function is selected from among the unexpanded nodes. The process of obtaining a child node to the selected node is sequentially performed. When the node assigned the expansion order number 23 is finally expanded, it matches the goal pattern, thereby terminating the process.

Thus, in the conventional method, the solution cannot be obtained until 23 nodes are expanded.

On the other hand, in the method according to the present invention shown in FIG. 18, the solution can be reached after expanding 9 nodes only. In the example shown in FIG. 18, the path from the node assigned the expansion order number 1, to the final pattern node number 9, through 4, 6, and 7, is preliminarily learned by the neural network. When each of the nodes in the path, that is, nodes 1, 4, 6, 7, and 9, is expanded as a child node, the result matches the hint, and the evaluation value becomes a minimum value by subtracting 40 from the evaluation value. Since the nodes in the path are expanded by priority (by minimizing the evaluation value), the number of finally expanded nodes is smaller than in a conventional method, thereby speeding up the entire process.

Figure 19:
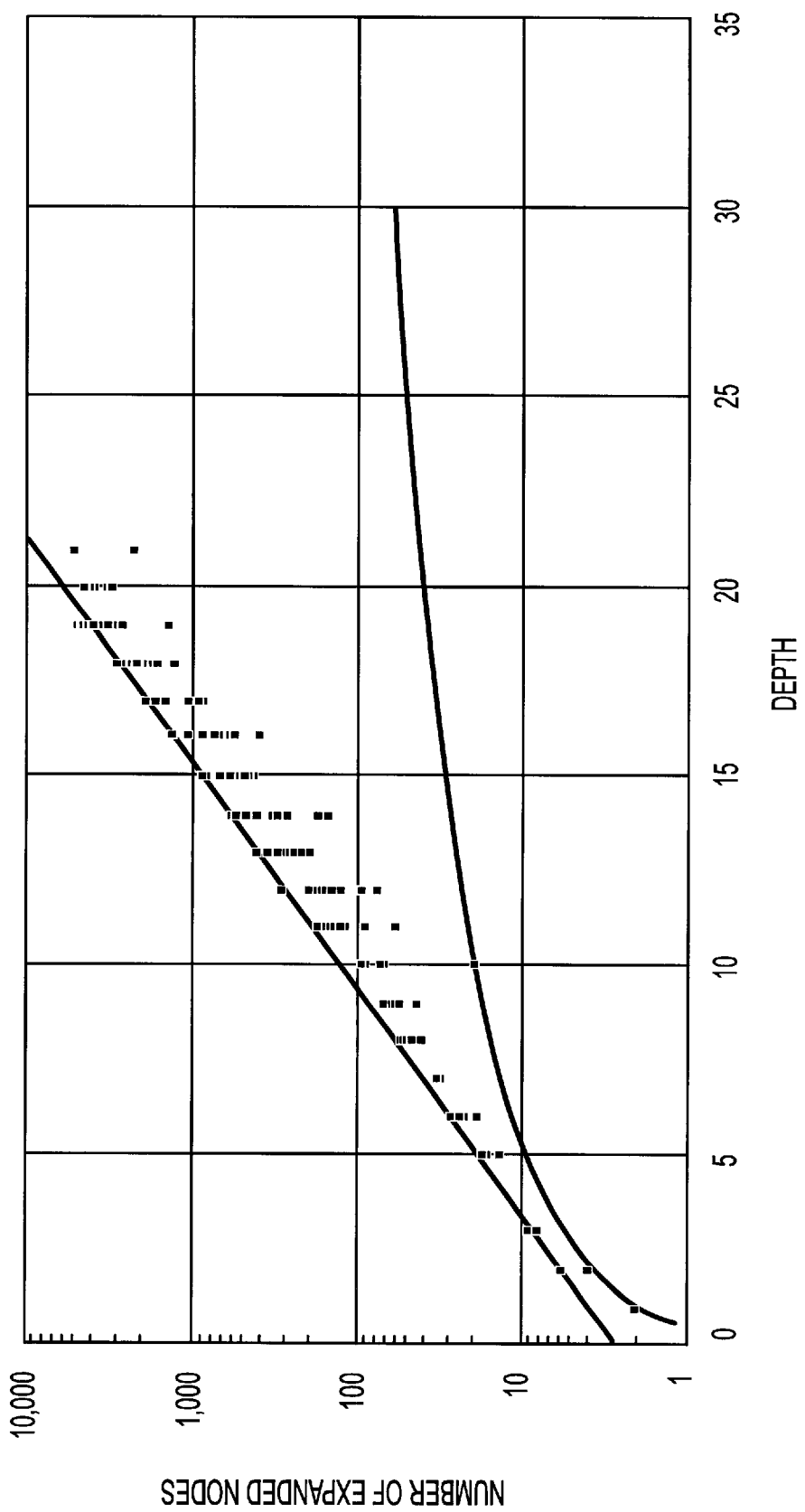
FIG. 19 shows the relationship between the depth of the first 2000 problems and the number of expanded nodes.
Figure 20:
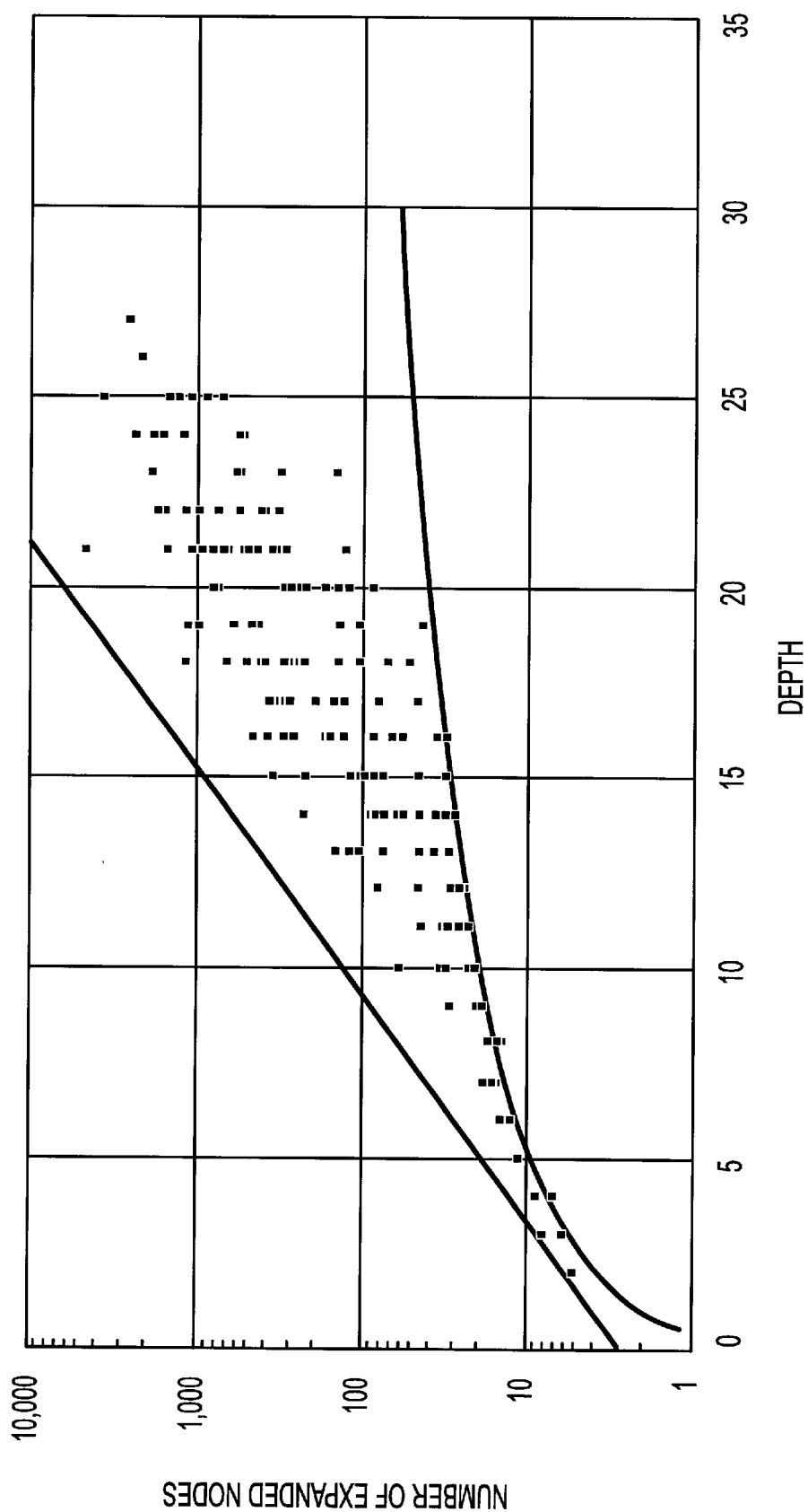
FIG. 20 shows the relationship between the depth of the 10,000th problem to the 2000 problems and the number of expanded nodes.
Figure 21:
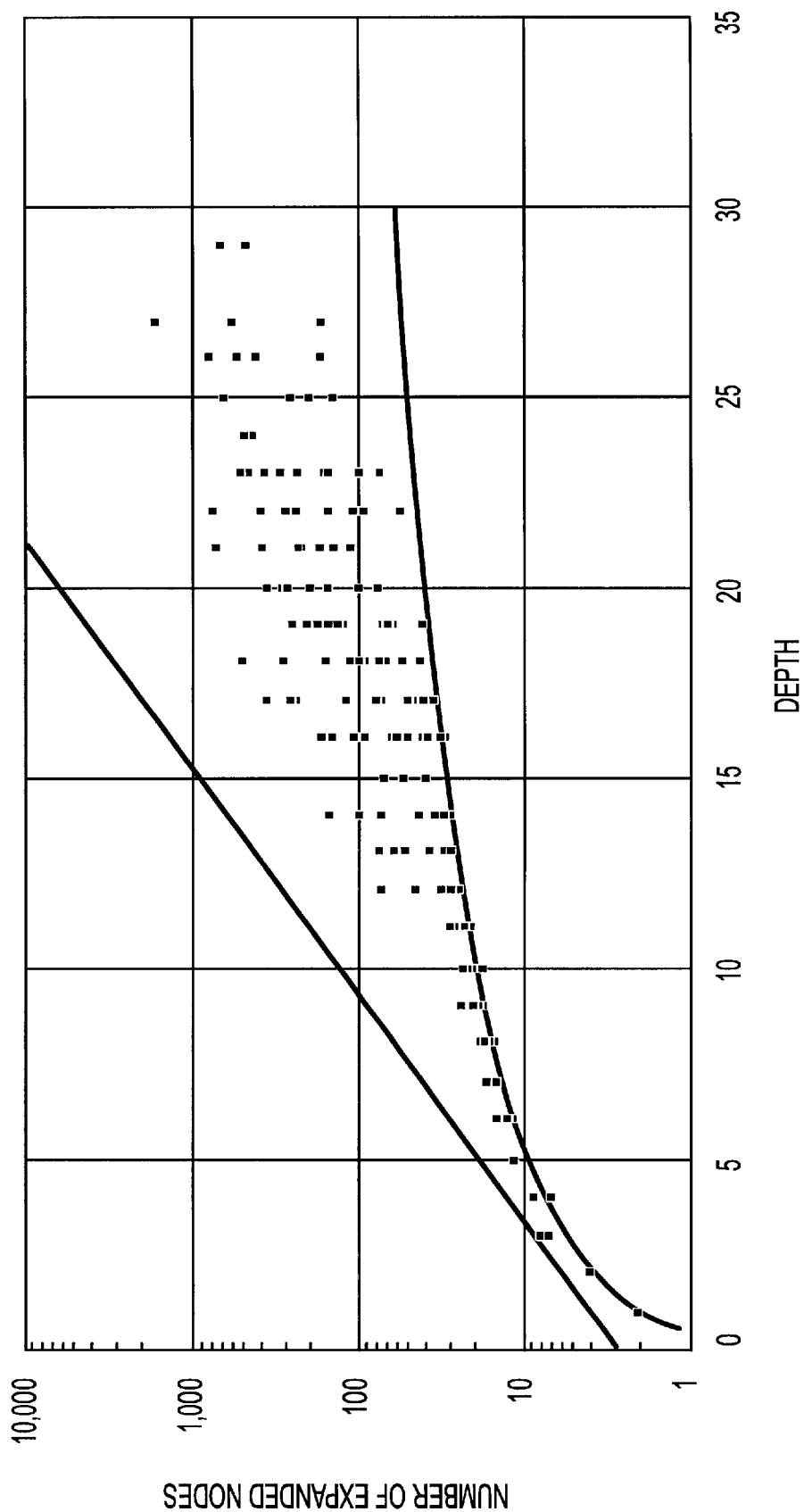
FIG. 21 shows the relationship between the depth of the 50,000th problem to the 2000 problems and the number of expanded nodes.

FIGS. 19 through 21 show the effect of the present invention. In these figures, the horizontal axis indicates the depth of the solution to the problem, that is, the number of steps required to actually solve the problem. The vertical axis indicates the number of nodes expanded to the depth of the problem.

FIG. 19 shows the plot of the solution depth to the number of expanded nodes corresponding to 2000 problems at the first step in which the learning process in the neural network has not proceeded.

FIG. 20 shows the results of 2000 problems at the stage at which the 10000th problem has been solved, that is, when the learning has proceeded to a certain extent. It indicates that the number of expanded nodes is decreasing.

FIG. 21 shows the results of 2000 problems when the learning process has terminated at 50000 problems. The learning has sufficiently proceeded and the number of expanded nodes is smaller than one several hundredth of the number shown in FIG. 19. Since the time required to solve the solution is proportional to the number of expanded nodes, the problem can be solved within one several hundredth of the time. Furthermore, problems larger than 25 steps in depth, which are not solved at the first stage shown in FIG. 19, can be successfully solved.

Described below is the second embodiment of the present invention.

Figure 22:
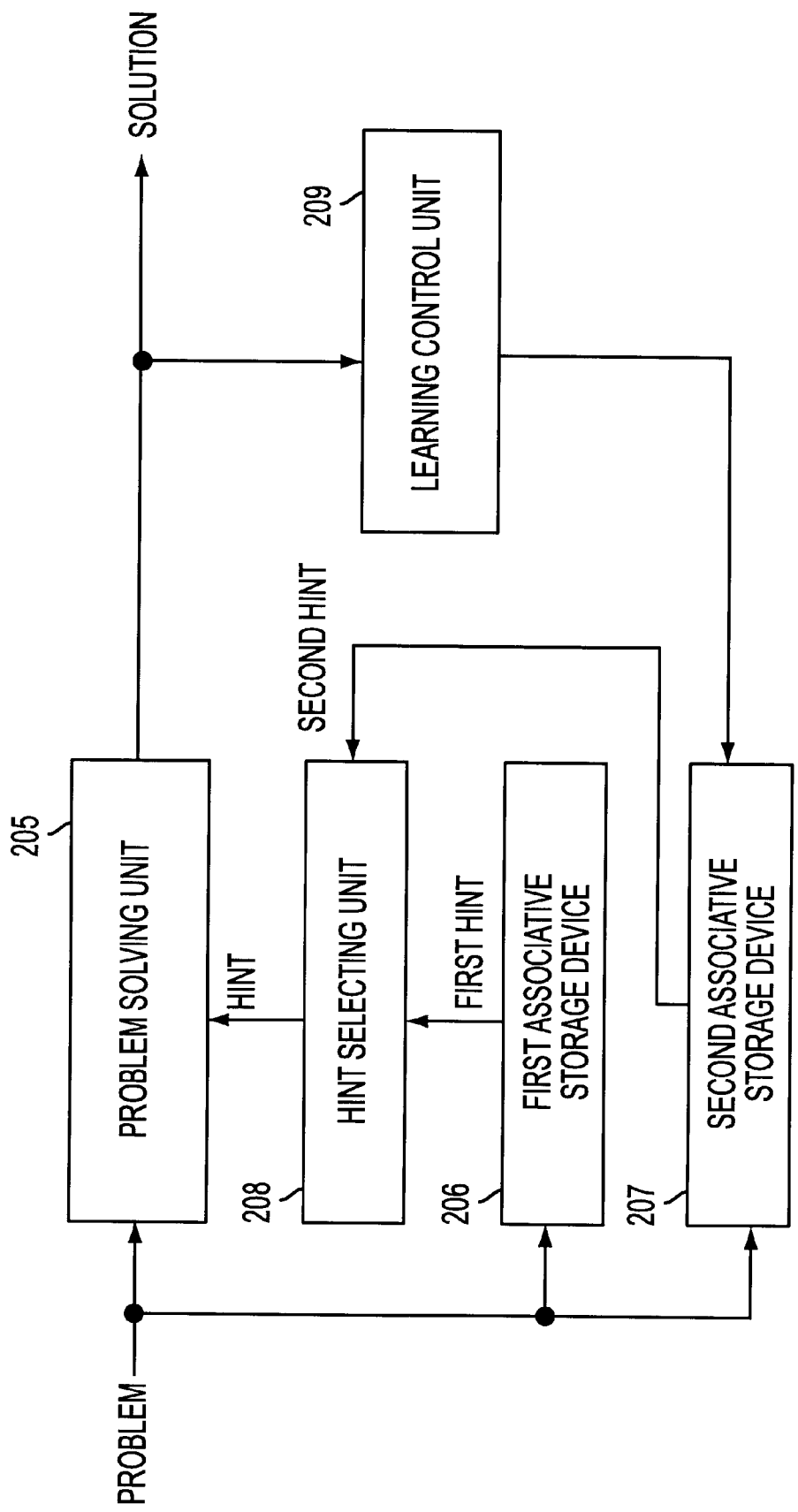
FIG. 22 is a block diagram showing the principle of the second embodiment of the problem solving apparatus.

FIG. 22 is a block diagram showing the principle of the second embodiment of the present invention. FIG. 22 as well as FIG. 4 showing the principle of the first embodiment is a block diagram which shows the principle of the problem solving apparatus for solving a given problem using a tree search in a symbol process.

In FIG. 22, a problem solving unit 205 obtains a solution to a given problem in a symbol process, for example, a tree search like the problem solving unit 201 shown in FIG. 4. A first associative storage device 206 and a second associative storage device 207 respectively output a first hint and a second hint to solve the given problem. A hint selecting unit 208 selects either the first or second hint, and provides the selection result for the problem solving unit 205. A learning control unit 209 makes the second associative storage device 207, for example, a neural network of the second associative storage device 207, perform a learning process using the solution output by the problem solving unit 205.

In FIG. 22, the first associative storage device 206 can also comprise a neural network, but the neural network has a weight set as a result of the complete learning process. On the other hand, the neural network forming part of the second associative storage device 207 is, at first, an unlearned network, and the system shown in FIG. 22 starts its operation with the unlearned network.

Since the neural network forming part of the first associative storage device 206 has already learned, it outputs the first hint relatively appropriate on the given problem. This hint is output in a way that the output value from the output unit corresponding to the position of a new blank is, for example, close to 1. On the other hand, since the neural network forming part of the second associative storage device 207 is unlearned, each of the plurality of the output units outputs a relatively small value, for example, about 0.1, and the output value is recognized as an ineffective hint on the position of a new blank.

However, each time a new problem is given, the neural network forming part of the second associative storage device 207 repeats learning data and outputs a larger value from the output unit corresponding to the position of a new blank with the proceeding of the learning process, thereby increasing the effectiveness of the second hint. For example, the hint selecting unit 208 provides the second hint from the second associative storage device 207 for the problem solving unit 205 when the output from one of the output units of the neural network forming part of the second associative storage device 207 exceeds, for example, 0.4. Until then, the hint selecting unit 208 provides, for example, the first hint output from the first associative storage device 206 for the first associative storage device 206.

Generally, a neural network has the problem that it performs a sensitive learning at the beginning of the learning process, but its learning effect deteriorates with the proceeding of the learning process.

Therefore, the second embodiment is designed to prevent the learning effect from totally deteriorating by making another neural network, that is, the second associative storage device 207, learn a new problem without making the first associative storage device 206 whose learning effect has deteriorated learn the new problem.

According to the second embodiment of the present invention, if the neural network forming part of the second associative storage device 207 has proceeded with its learning process to some extent, the weight of the neural network is transferred to the neural network forming part of the first associative storage device 206, and the neural network forming part of the second associative storage device 207 starts the learning process again from the initial state. These processes are repeated to furthermore improve the learning efficiency.

As described above, the problem solving apparatus has the learning function using neural networks according to the second embodiment of the present invention.

Figure 23:
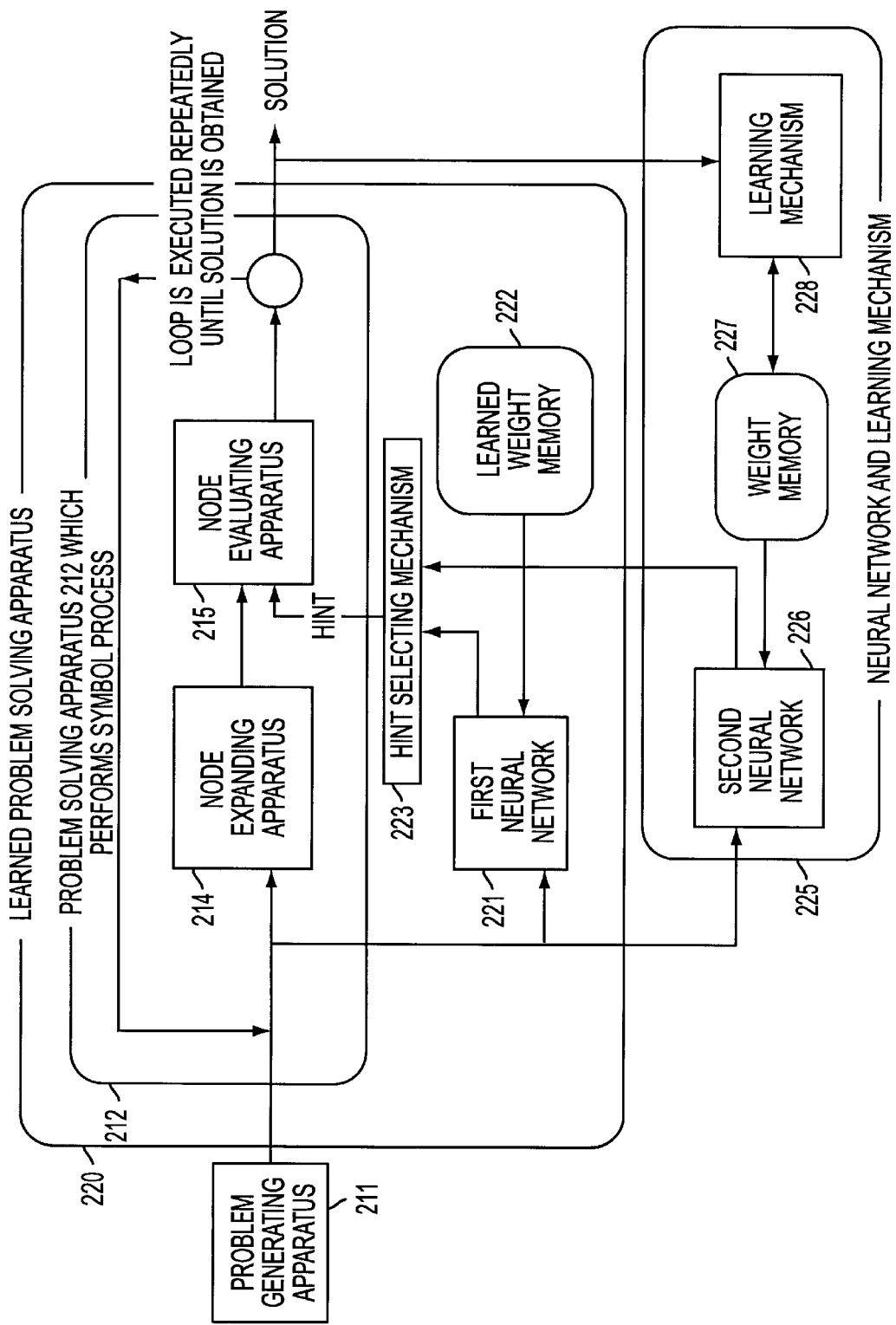
FIG. 23 is a block diagram showing the configuration of the problem solving apparatus according to the second embodiment of the present invention.

FIG. 23 is a block diagram of the problem solving apparatus according to the second embodiment of the present invention. In FIG. 23, the problem generating apparatus 211, the node expanding apparatus 214, and the node evaluating apparatus 215, both forming part of the problem solving apparatus 212 which performs a symbol process, are the same as those according to the first embodiment of the present invention shown in FIG. 6.

According to the second embodiment of the present invention, a problem solving apparatus 220 comprises the problem solving apparatus 212 which performs a symbol process, a first neural network 221, a learned weight memory 222, and a learned problem solving apparatus 220 which has performed the learning process through a hint selecting mechanism 223.

The first neural network 221 corresponds to the neural network 217 according to the first embodiment of the present invention which has finished a sufficient learning process, for example, 10,000 through 100,000 times. The weight of the internal coupling of the first neural network 221 is stored in the learned weight memory 222. The hint selecting mechanism 223 selects either a hint output from the first neural network 221 or a hint output from a second neural network 226 described later, and outputs the selection result as a hint on obtaining the solution to the problem for the node evaluating apparatus 215. The operations of the hint selecting mechanism 223 is described later.

According to the second embodiment, another neural network and a learning mechanism 225 are provided for the learned problem solving apparatus 220. The learning mechanism 225 comprises the second neural network 226, the weight memory 227, and the learning mechanism 228. The neural network and the learning mechanism 225 operates similarly to the neural network and the learning mechanism 213 of the first embodiment of the present invention. That is, the second neural network 226 also outputs to the hint selecting mechanism 223 a hint on obtaining a solution to the problem generated by the problem generating apparatus 211. The second neural network 226 performs the learning process through a learning mechanism 228 using the solution output from the problem solving apparatus 212 which performs a symbol process. A weight memory 227 holds the internal coupling weight of the second neural network 226 as a learning result.

Figure 24:
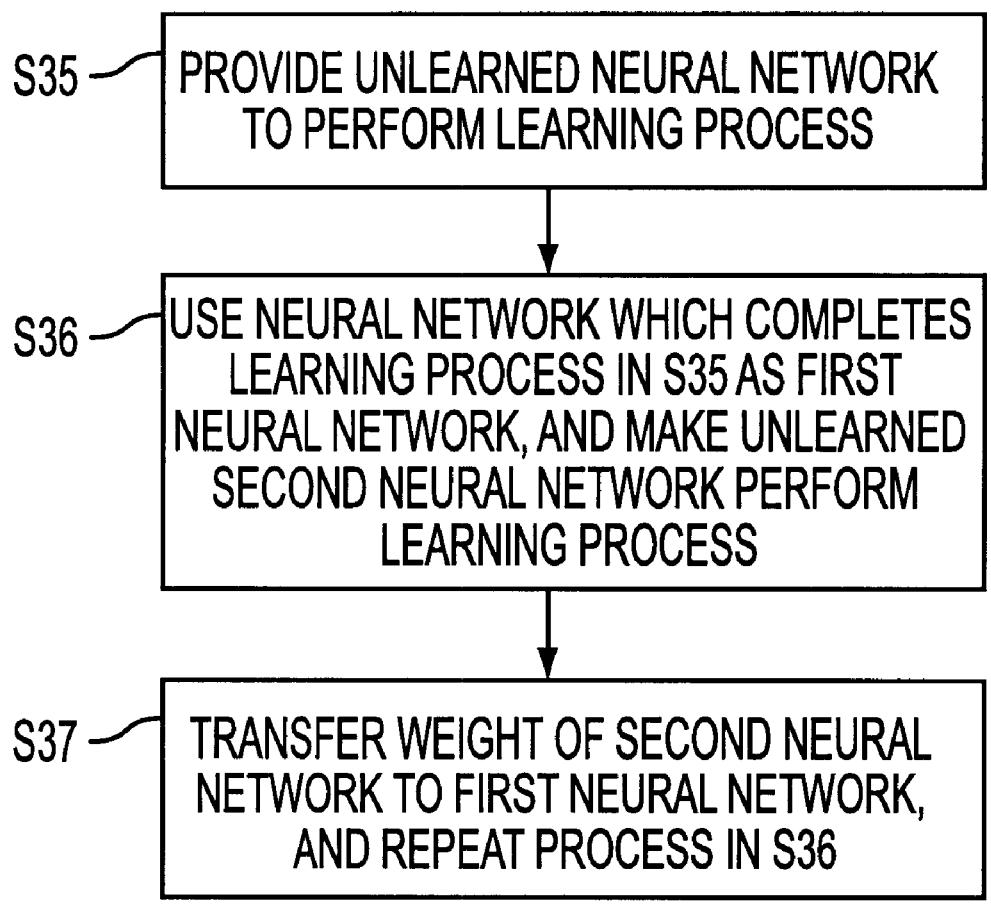
FIG. 24 shows the entire process of the second embodiment of the present invention.

FIG. 24 shows the entire process of the problem solving apparatus according to the second embodiment of the present invention. In FIG. 24, an unlearned neural network is provided in step S35 to perform a learning process. In FIG. 23, for example, the second neural network 226 performs the learning process in which the hint selecting mechanism 223 constantly selects the output from the second neural network 226.

Then, in step S36, the learned neural network is used as the first neural network 221, and the second neural network 226 performs the learning process again. That is, in FIG. 23, the contents of the weight memory 227 is transferred to the learned weight memory 222 as a learning result of the second neural network 226. The weight is set in the first neural network 221, the weight of the second neural network 226 is initialized, and the second neural network 226 performs the learning process again.

Then, in step S37, the process in step S36 is repeated plural times as necessary, for example, each time the absolute value of the output from any one of the output units in the second neural network exceeds a predetermined value (for example, 0.8). That is, the weight of the second neural network 226 is transferred to the first neural network 221, and the second neural network 226 is initialized, and performs its learning process.

Figure 25:
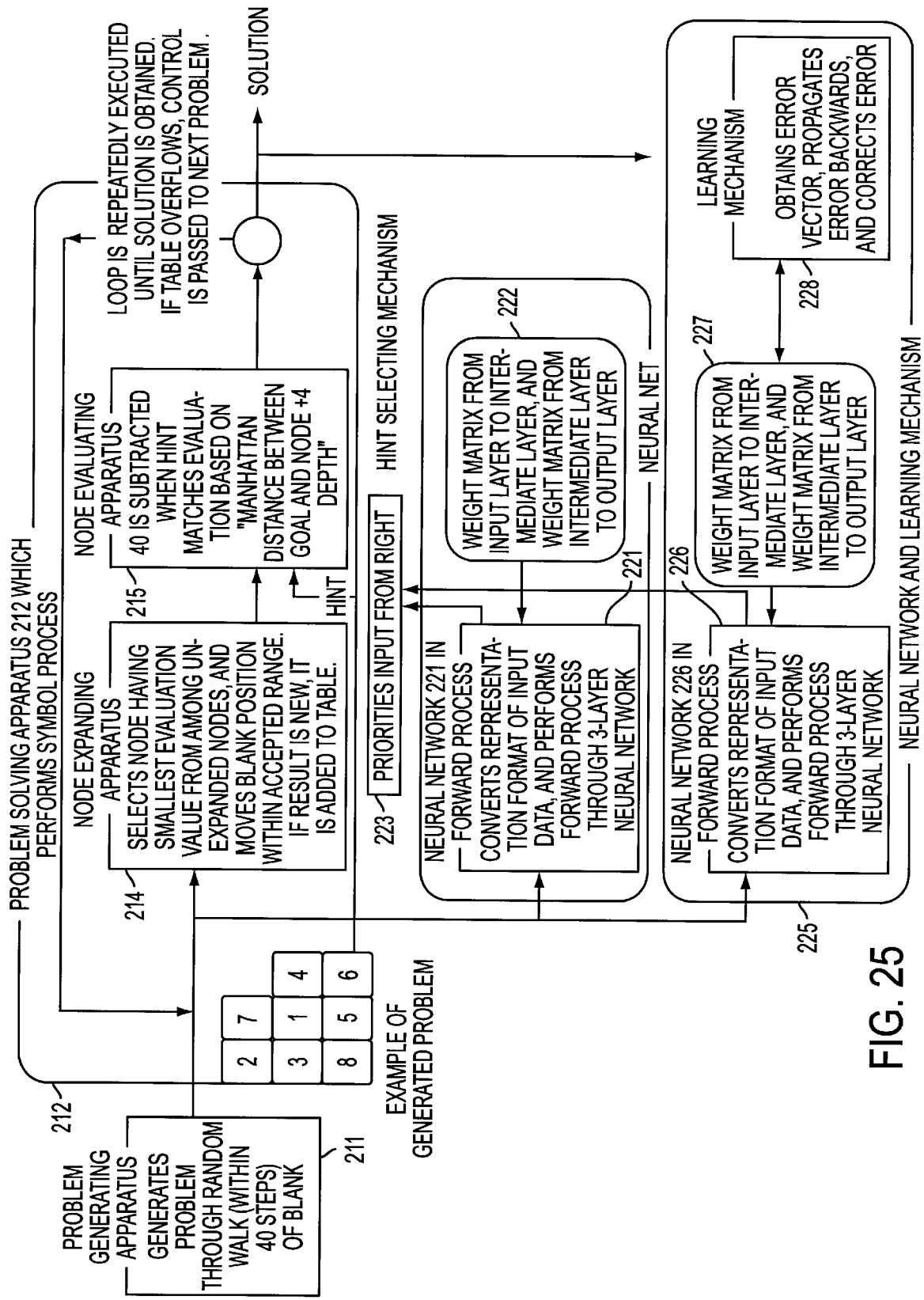
FIG. 25 shows the operations in the 8-tile puzzle performed by the problem solving apparatus according to the second embodiment of the present invention.

FIG. 25 shows the operations of the problem solving apparatus in processing the 8-tile puzzle according to the second embodiment. Since FIG. 25 shows almost the same processes as FIG. 6 corresponding to the first embodiment of the present invention except that the hint selecting mechanism 223 prioritizes the input received from the right, that is, a hint which is the result of the forward process of the second neural network 226 and provides the node evaluating apparatus 215 with the hint to solve the problem. Therefore, the detailed explanation about the operations is omitted here. A selecting process by the hint selecting mechanism 223 prioritizes the input received from the right, that is the result of the forward process of the second neural network. This selecting process is described by referring to FIG. 26.

Figure 26:
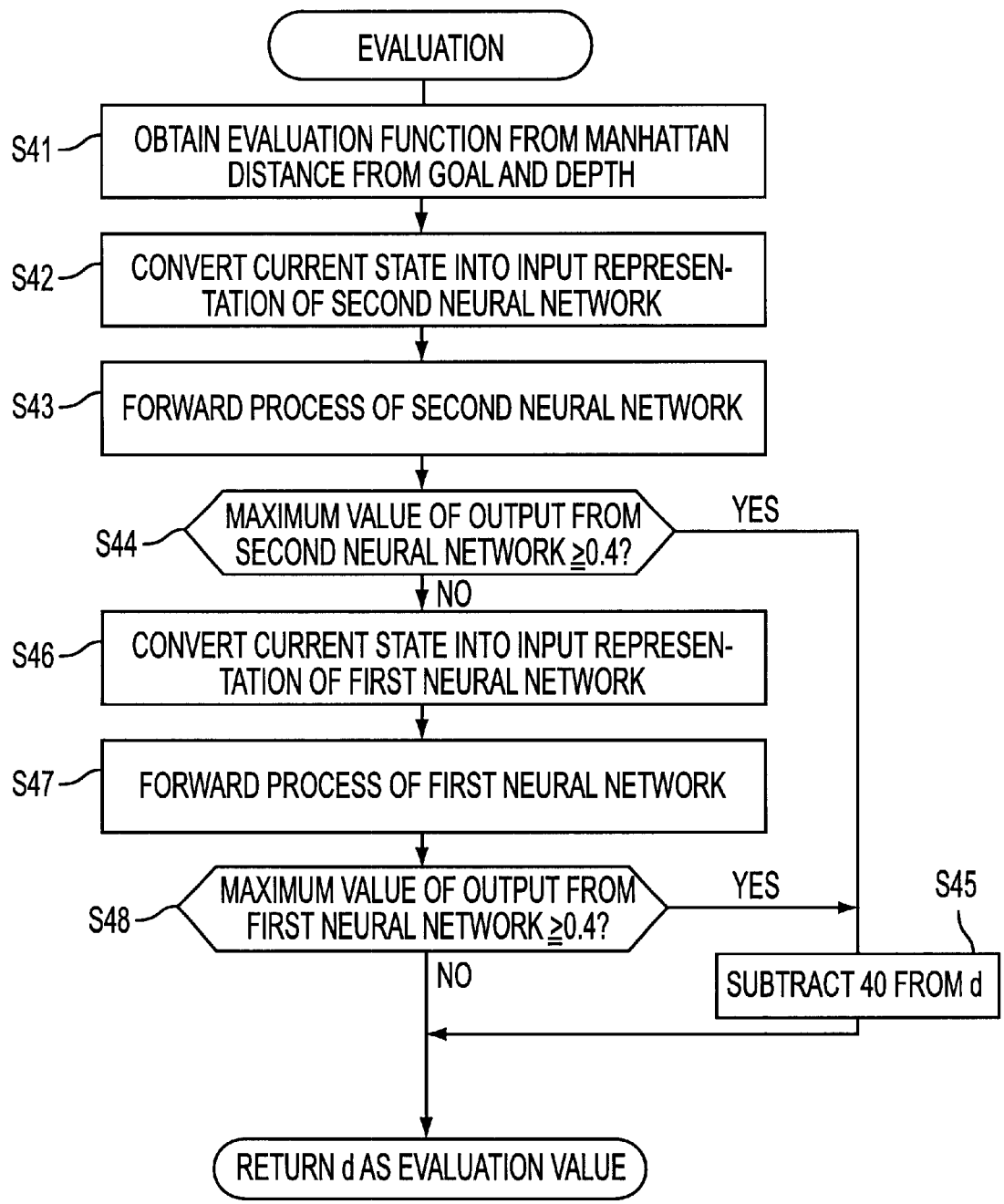
FIG. 26 is a flowchart showing the evaluation process according to the second embodiment of the present invention.

FIG. 26 is a flowchart showing the evaluating process according to the second embodiment of the present invention. When the process starts as shown in FIG. 26, an evaluation function d is obtained from the Manhattan distance from the goal and the depth in step S41 as in step S21 shown in FIG. 11. Then, in step S42, the current state is converted into an input representation of the second neural network, and the forward propagation process of the second neural network is performed in step S43.

Then, in step S44, it is determined whether or not the maximum value of the output values from, for example, the nine output units of the second neural network is larger than a predetermined threshold, for example 0.4. If an output of any unit is equal to or larger than 0.4, then the position of the blank corresponding to the unit refers to a new blank position, that is, a hint. In step S45, 40 is subtracted from d, and a new value for d is returned as an evaluation value, thereby terminating the process.

If the maximum value of the output values from the output units of the second neural network is smaller than 0.4 in step S44, then the current state is converted into the input representation of the first neural network in step S46, and the forward propagation process is performed in the first neural network in step S47. In step S48, it is determined whether or not the maximum value of the output values from the output units of the first neural network is larger than 0.4. If the maximum value is equal to or larger than 0.4, then the new blank position corresponding to the output unit is referred to as a hint, 40 is subtracted from the value d of the evaluation function in step S45, and a new value of d is returned as an evaluation value, thereby terminating the process. If the maximum value of the output values from the output units of the first neural network is smaller than 0.4 in step S48, then the process is stopped and the evaluation value d is returned, thereby terminating the process.

The operations of the hint selecting mechanism 223 of prioritizing the input from the right, that is, the result of the forward process of the second neural network, and outputting the result as a hint to the node evaluating apparatus 215 as shown in FIG. 25 correspond to the processes in steps S42 through S44 shown in FIG. 26 to be performed before the processes in step S46 through S48.

According to the second embodiment, since the first neural network 221 has already performed the learning process as described above, it is obvious that the first neural network 221 outputs an effective hint at the initial step of the system operation according to the second embodiment as shown in FIG. 25.

However, with the proceeding of the learning of the second neural network 226, the second neural network 226 also outputs an effective hint, and it is determined in step 44 shown in FIG. 26 whether or not the hint is effective.

When the system starts its operation as shown in FIG. 25, it is assumed that the outputs from the output units of the second neural network 226 are smaller than 0.4. However, it is expected that the output unit corresponding to the hint outputs a value close to +0.9 when the learning completes, by providing teaching data of +0.9 for the corresponding output unit as described above by referring to FIG. 13C. According to the second embodiment of the present invention, when there is an output unit which outputs an approximately half of the expected value, the hint corresponding to the position of the unit is provided for the node evaluating apparatus 215 through the hint selecting mechanism 223. It is obvious that the value is not limited to 0.4.

Figure 27:
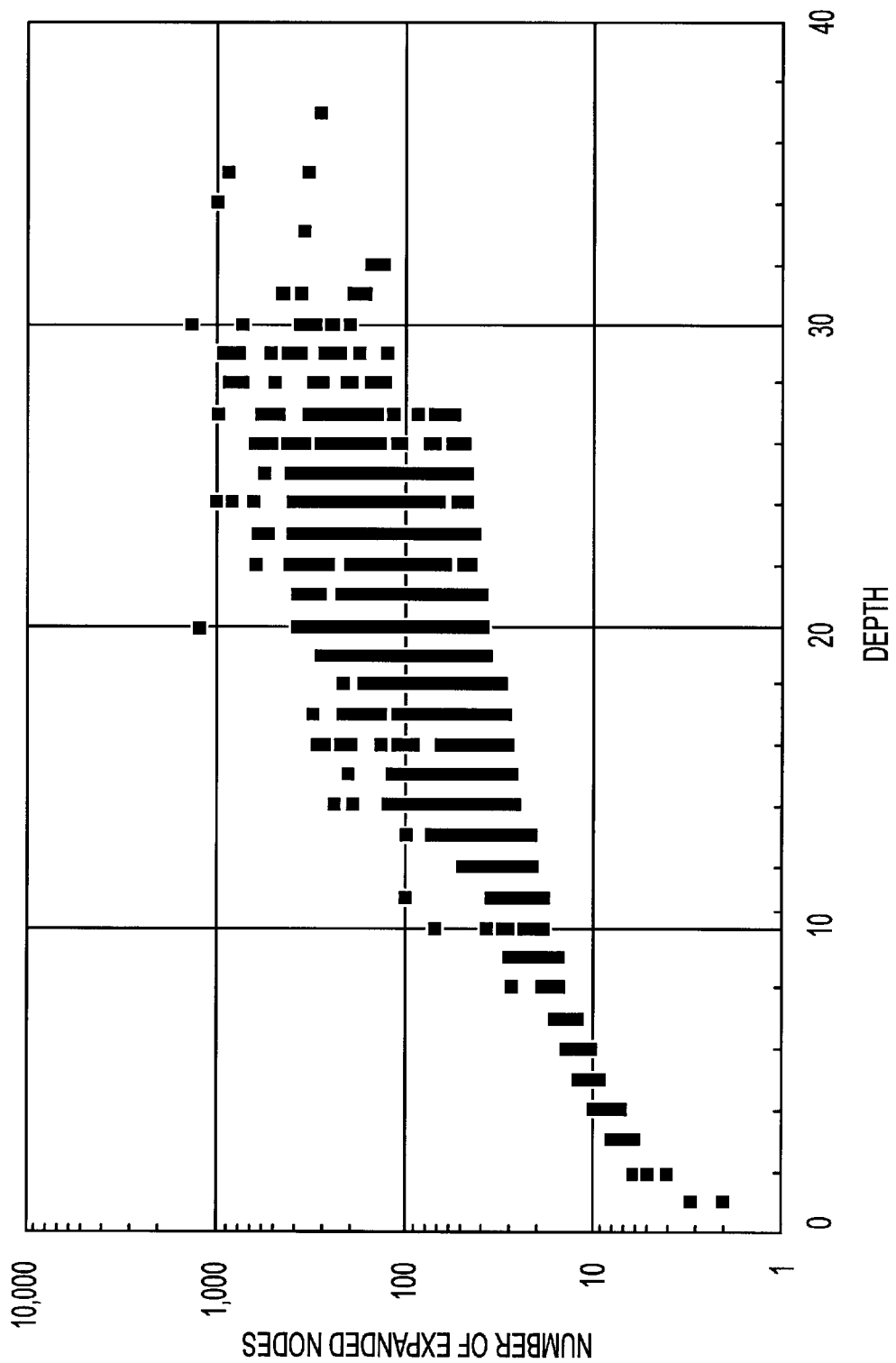
FIG. 27 shows the relationship between the depth of the first 2000 problems and the number of expanded nodes according to the second embodiment of the present invention.
Figure 28:
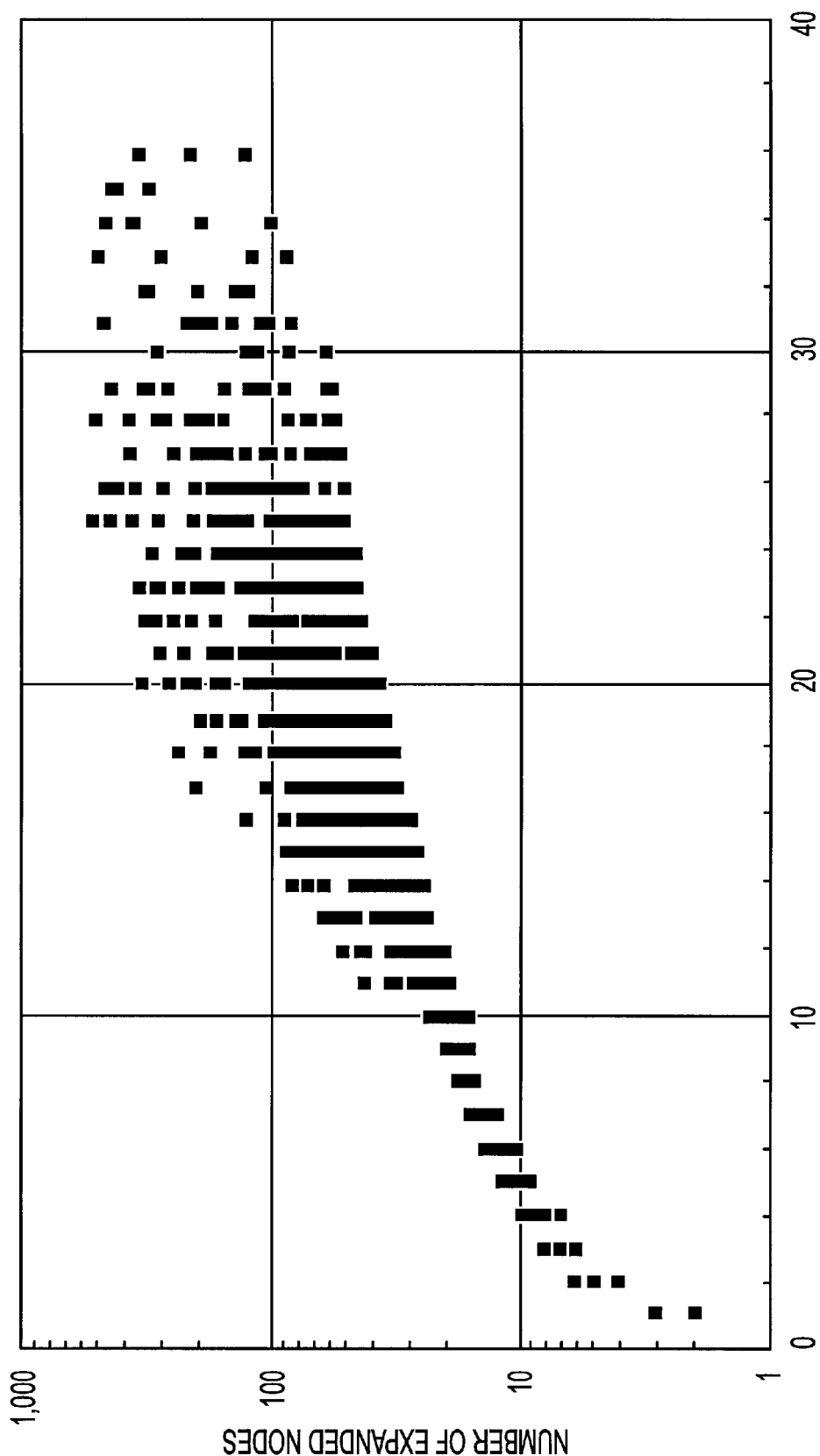
FIG. 28 shows the relationship between the depth of the 10,000th problem to the 2000 problems and the number of expanded nodes according to the second embodiment of the present invention.
Figure 29:
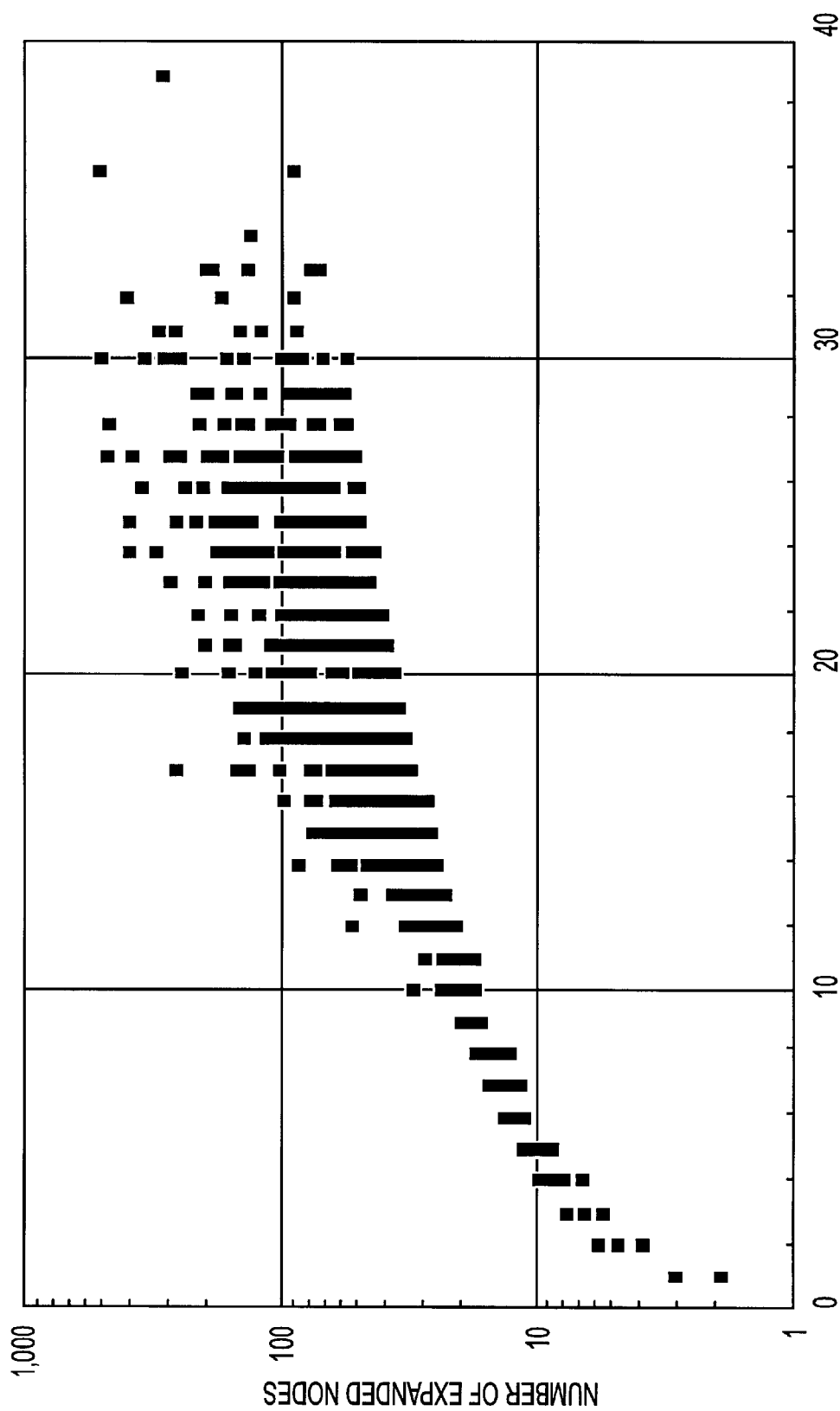
FIG. 29 shows the relationship between the depth of the 50,000th problem to the 2000 problems and the number of expanded nodes according to the second embodiment of the present invention.

FIGS. 27 through 29 show the effect of the second embodiment of the present invention. These figures are identical to FIGS. 19 through 21 showing the effect of the first embodiment of the present invention.

FIG. 27 shows a plot of the number of expanded nodes to the depth of a solution at the initial state of the operation of the system according to the second embodiment. In this state, it is assumed that a hint on obtaining a solution is given by the learned first neural network.

FIG. 28 shows the learning process when the 10,000th learning has been completed, and it is assumed that the output from the second neural network can also be selected.

FIG. 29 shows the learning process when the 50,000th learning has been completed, and it is assumed that most hints are given by the second neural network. For example, the number of expanded nodes to, for example, the depth 20 is larger than 1,000 in FIG. 27 while it is 400 at maximum in FIG. 28 and 300 at maximum in FIG. 29. Thus, the number of expanded nodes decreases with the proceeding of the learning process performed by the second neural network.

Figure 30B:
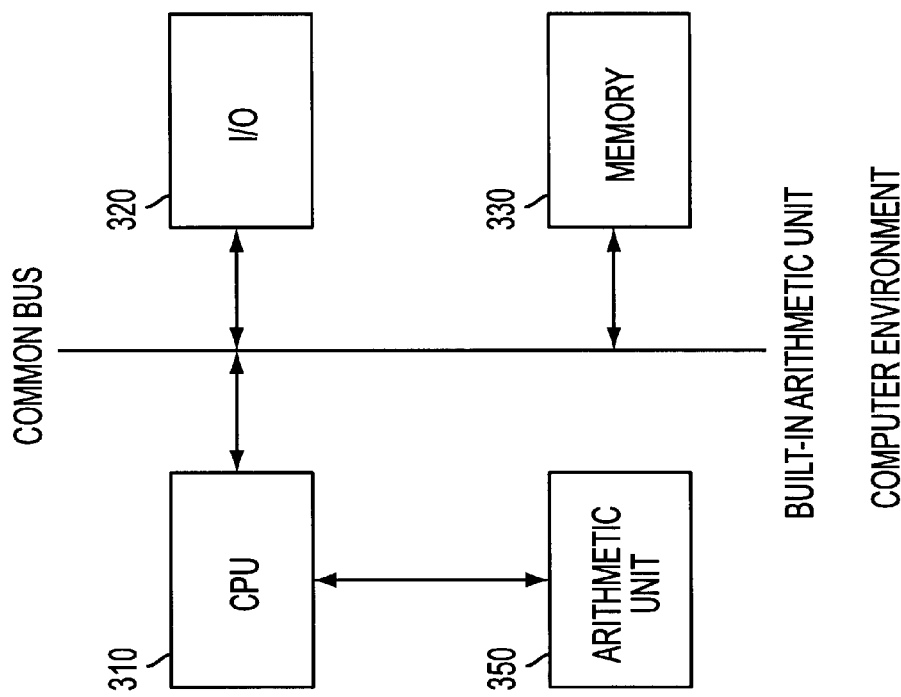
FIGS. 30A and 30B show the computer environment in which the problem solving apparatus according to the present invention is realized.
Figure 30A:
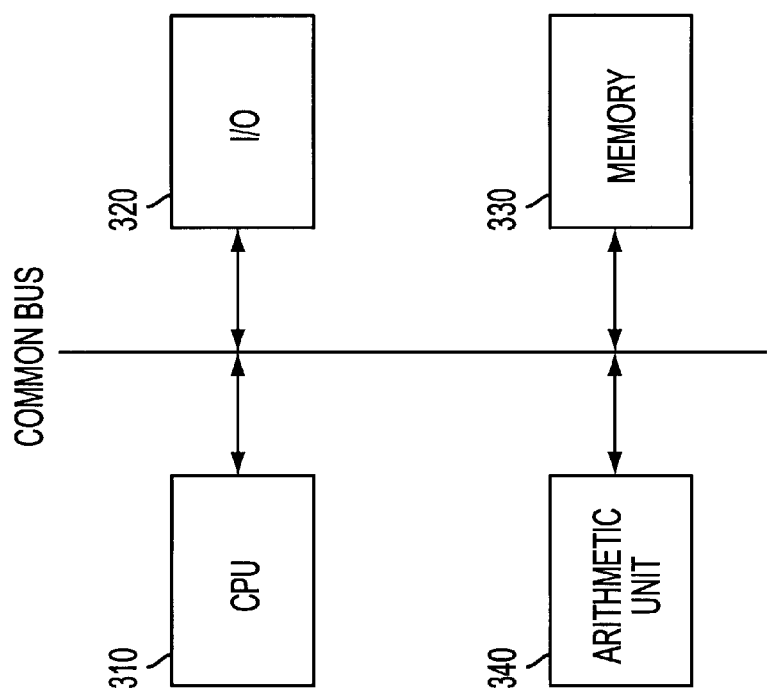

FIGS. 30A and 30B show an example of the computer environment to which the problem solving apparatus having the learning function according to the present invention is applied.

FIG. 30A shows an example of an externally mounted arithmetic unit. In FIG. 30A, a CPU 310, an I/O 320, memory 33, and an arithmetic unit 340 are connected to a common bus. The CPU 310 is a central processing unit for controlling the entire system, and for example, performs the data transfer by controlling the I/O 320.

The memory 330 can be, for example, a weight memory 219 shown in FIG. 5 according to the first embodiment, the learned weight memory 222, the weight memory 227, etc. of the first and second neural networks shown in FIG. 23 according to the second embodiment. It can be used as, for example, RAM, etc. for temporarily storing the data for use in a learning process performed by neural networks. The arithmetic unit 340 is, for example, an arithmetic operation unit for realizing the function of computing an evaluation value, etc. using the node evaluating apparatus 215 shown in FIG. 5.

FIG. 30B shows an example of a built-in arithmetic unit. With the configuration shown in FIG. 30B, an arithmetic unit 350 is not connected to the common bus but is connected to the CPU 310. Otherwise, the configuration shown in FIG. 30B is the same as that shown in FIG. 30A.

Figure 31:
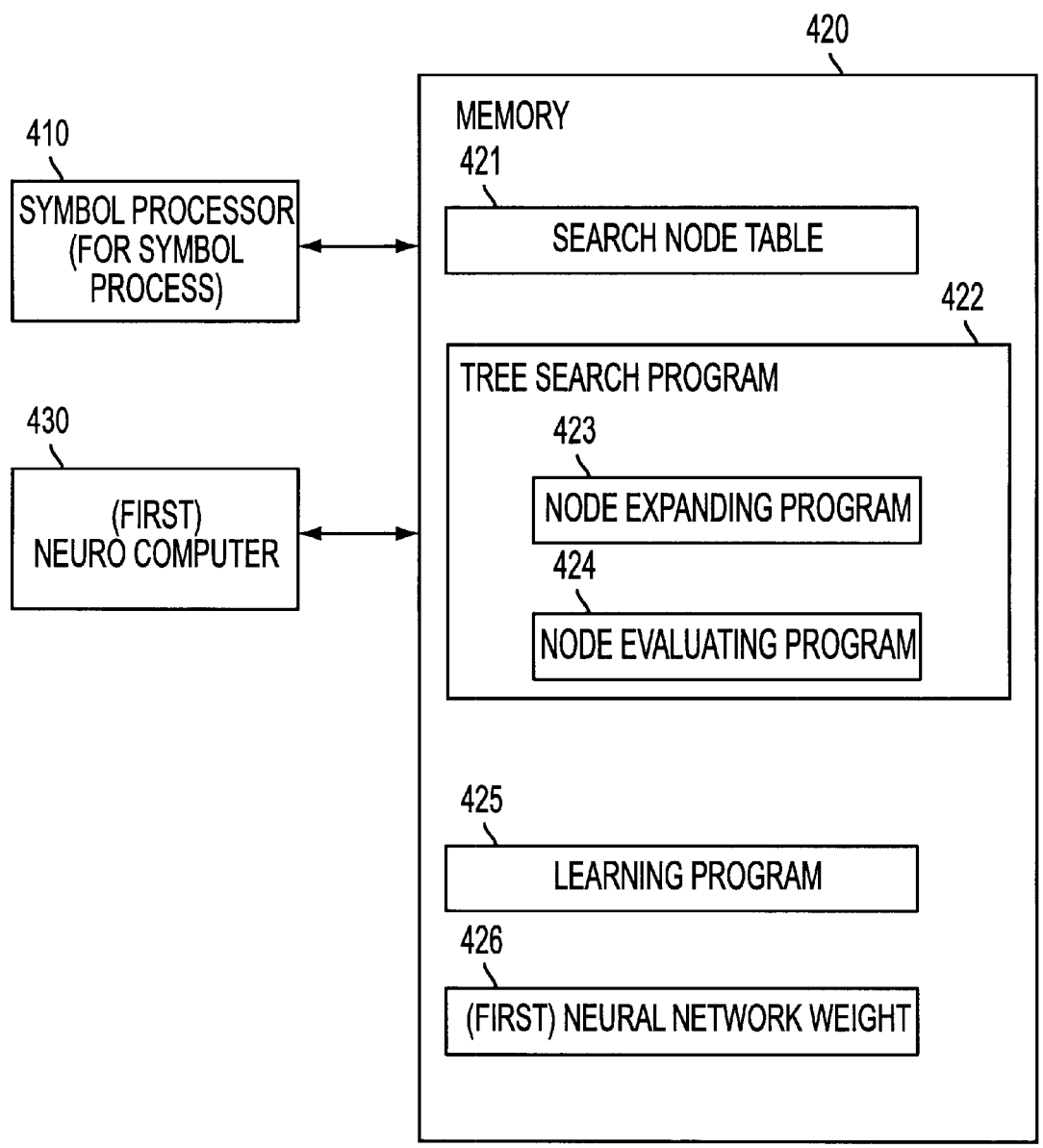
FIG. 31 is a block diagram showing the configuration of the computer system which realizes the first embodiment of the present invention.

FIG. 31 is a block diagram showing the configuration of the computer system for realizing the first embodiment of the present invention using an exclusive neuro computer. In FIG. 31, the system comprises a symbol processor 410 for processing data for the (first) neural network, a (first) neuro computer 430, and memory 420.

The memory 420 stores a search node table 421 shown in FIG. 8, a tree search program 422, a learning program 425, and a neural network weight 426. The tree search program 422 contains a node expanding program 423 and a node evaluating program 424.

Figure 32:
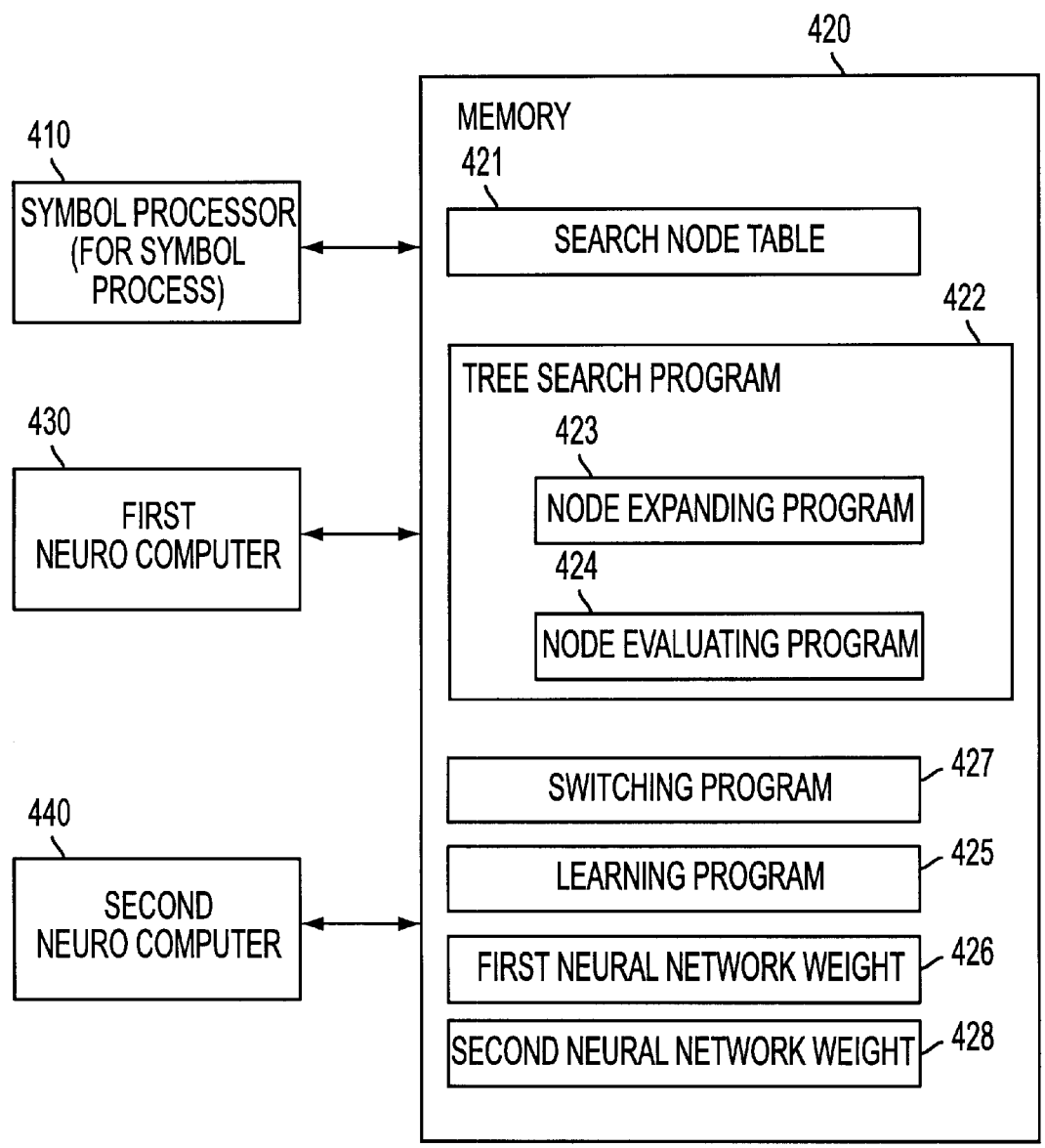
FIG. 32 is a block diagram showing the configuration of the computer system which realizes the second embodiment of the present invention.

FIG. 32 is a block diagram showing the configuration of the computer system for realizing the second embodiment of the present invention using an exclusive neuro computer. The configuration shown in FIG. 32 is obtained by adding a second neuro computer 440 for processing data for the second neural network to the configuration shown in FIG. 31.

In addition to the search node table 421, the tree search program 422, the learning program 425, and the first neural network weight 426 shown in FIG. 31, the memory 420 contains the second neural network weight 428 and a switching program 427 for transferring, and the second neural network weight shown to the first neural network and initializing the second neural network to re-processing the learning, shown in FIG. 24. The tree search program 422 contains the node expanding program 423 and the node evaluating program 424 as shown in FIG. 31.

As described in detail above, a problem can be efficiently solved in a symbol process using a neural network without heuristic knowledge, or using simple heuristic knowledge (Manhattan distance, number of numbered tiles placed at wrong positions, etc. according to the present invention. That is, conventionally, a solution is obtained based on a problem already solved using effective but comparatively complicated heuristic knowledge from experience. Therefore, it is not practical and is generally difficult to actually solve the problem. Furthermore, it involves a great expenditure of labor and time. According to the problem solving apparatus of the present invention, the above described processes can be automatically performed.

To solve a problem similar to a problem already solved, the time required to solve the problem can be considerably shortened and the performance of the problem solving apparatus can be greatly improved.

The problem solving apparatus having the learning function according to the present invention can also be realized by a program. That is, all or a part of the functions of obtaining a solution by solving a problem in a symbol process, operating a neural network for outputting a hint on solving the problem, and having the neural network learn data using the solution can be realized by a program. In this case, for example, a storage medium such as an FD, CD-ROM, MO, etc. stores program codes in realizing the above described functions in a computer-readable format. The computer can read and execute the program codes to realize the above described functions.

What is claimed is:

1. A problem solving apparatus having a learning function, comprising:

problem solving means for obtaining a path in a tree search as a solution in a symbol process in response to a given problem;

first associative storage means comprising a first neural network for outputting a first hint on solving the given problem in response to the given problem;

second associative storage means comprising a second neural network for outputting a second hint on solving the given problem in response to the given problem;

hint selecting means for selecting one of the first hint and the second hint output from one of said first associative storage means and said second associative storage means, and providing the selected hint for said problem solving means; and learning control means for having said second associative storage means perform a learning process using the solution output from said problem solving means.

2. The problem solving apparatus according to claim 1, wherein each of said first and second neural networks is a 3-layer hierarchical neural network.

3. The problem solving apparatus according to claim 1, further comprising:

first weight storage means for storing a learning result of said first associative storage means as a weight of a neural network, and second weight storage means for storing a learning result of said second associative storage means as a weight of a neural network, wherein said learning control means makes said second associative storage means perform a learning process by changing a weight stored by said second weight storage means.

4. The problem solving apparatus according to claim 3, further comprising:

learning transfer means for transferring the weight stored by said second weight storage means to said first weight storage means when the learning process performed by said second associative storage means progresses to a certain extent, and initializing stored data in said second weight storage means.

5. The problem solving apparatus according to claim 1, wherein said hint selecting means selects the second hint when an output from said second associative storage means is equal to or larger than a predetermined value, and selects the first hint when the output is smaller than the predetermined value.

6. The problem solving apparatus according to claim 1, further comprising:

learning transfer means for transferring a learning result of said second associative storage means to said first associative storage means when the learning process performed by said second associative storage means progresses to a certain extent, and setting said second associative storage means in an unlearned state.

7. The problem solving apparatus according to claim 6, wherein said learning transfer means transfers a learning result of said second associative storage means to said first associative storage means when an output of said second associative storage means is equal to or larger than a predetermined value, and sets said second associative storage means in an unlearned state.

8. The problem solving apparatus according to claim 1, wherein each of said first and second neural networks is a hierarchical neural network;

said problem solving means outputs, in response to the given problem, as the solution a path obtained by a tree search from a starting node to a goal node by way of one or more nodes;

said learning control means makes said second associative storage means perform the learning process by providing an input layer unit in the hierarchical neural network with data corresponding to a child node of one of two consecutive nodes, whichever is closer to the starting node, on the path in the tree search.

9. The problem solving apparatus according to claim 8, wherein said first and second associative storage means output a child node to be selected from among a plurality of child nodes of the parent node on the path for a problem being processed by said problem solving means as the first hint and the second hint.

10. The problem solving apparatus according to claim 1, wherein said first associative storage device has finished the learning process and said second associative storage device has been in an unlearned state, in an initial state.

11. The problem solving apparatus according to claim 1, wherein said learning control means makes said second associative storage device perform the learning process in a back propagation method.

12. The problem solving apparatus according to claim 1, wherein said problem solving means obtains a solution to the given problem in a tree search.

13. The problem solving apparatus according to claim 12, wherein said tree search is made in a best first method in which an expanding order of a node is determined such that an evaluation function indicates a minimum value based on a predetermined equation.

14. A problem solving apparatus having a learning function, comprising:

problem solving means for obtaining a path in a tree search as a solution in a symbol process in response to a given problem;

first associative storage means comprising a learned neural network in an initial state for outputting a first hint on solving the given problem in response to the given problem;

second associative storage means comprising an unlearned neural network in the initial state for outputting a second hint on solving the given problem in response to the given problem;

hint selecting means for selecting one of the first hint and the second hint output from one of said first associative storage means, and providing the selected hint for said problem solving means; and learning control means for having said second associative storage means perform a learning process using the solution output from said problem solving means.

15. The problem solving apparatus according to claim 14, wherein said hint selecting means selects the second hint when an output from said second associative storage means is equal to or larger than a predetermined value, and selects the first hint when the output is smaller than the predetermined value.

16. The problem solving apparatus according to claim 14, further comprising:

learning transfer means for transferring a learning result of said second associative storage means to said first associative storage means when the learning process performed by said second associative storage means progresses to a certain extent, and setting said second associative storage means in an unlearned state.

17. A problem solving apparatus having a learning function, comprising:

problem solving means for obtaining a path in a tree search as a solution in a symbol process by expanding and evaluating a node using an evaluation function based on a predetermined equation in response to a problem to which the solution is obtained in the tree search;

first associative storage means comprising a first neural network for outputting a first hint on solving the problem in response to the problem;

second associative storage means comprising a second neural network for outputting a second hint on solving the problem in response to the problem;

hint selecting means for selecting one of the first hint and the second hint output from one of said first associative storage means and said second associative storage means, and providing the selected hint for said problem solving means; and learning control means for having said second associative storage means perform a learning process using the solution output from said problem solving means, wherein said first and second hints are child nodes to be selected from among a plurality of child nodes of a parent node in expanding the node.

18. The problem solving apparatus according to claim 17, wherein each of said first and second neural networks is a hierarchical neural network;

said learning control means make said second associative storage means perform the learning process by providing an input layer unit in the hierarchical neural network with data corresponding to a child node of one of two consecutive nodes, whichever is closer to the starting node, on the path in the tree search.

19. The problem solving apparatus according to claim 17, wherein said problem solving means outputs, in response to the given problem, as the solution a path obtained by a tree search from a starting node to a goal node by way of one or more nodes.

20. A method of solving an input problem using a learning function, comprising:

selecting one of a first hint obtained from a first neural network and a second hint obtained from a second neural network for use in solving the input problem;

obtaining a path in a tree search as a solution to the input problem using the hint in a symbol process; and making said second neural network perform a learning process using the solution.

21. A computer-readable storage medium used to direct a computer to perform the functions of:

selecting one of a first hint obtained from a first neural network and a second hint obtained from a second neural network for use in solving the input problem;

obtaining a path in a tree search as a solution to the input problem using the hint in a symbol process; and making said second neural network perform a learning process using the solution.

* * * * *